US012456419B2

(12) United States Patent
Lee et al.

(10) Patent No.: US 12,456,419 B2
(45) Date of Patent: Oct. 28, 2025

(54) DISPLAY DEVICE AND METHOD OF OPERATING A DISPLAY DEVICE

(71) Applicant: Samsung Display Co., LTD., Yongin-si (KR)

(72) Inventors: Myeong-Eon Lee, Yongin-si (KR); Soo-Lin Kim, Yongin-si (KR); Tae-Jong Jun, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/582,978

(22) Filed: Feb. 21, 2024

(65) Prior Publication Data

US 2024/0282254 A1 Aug. 22, 2024

(30) Foreign Application Priority Data

Feb. 22, 2023 (KR) ........................ 10-2023-0023254

(51) Int. Cl.
*G09G 3/20* (2006.01)
*G09G 3/3208* (2016.01)

(52) U.S. Cl.
CPC ......... *G09G 3/3208* (2013.01); *G09G 3/2074* (2013.01); *G09G 2320/0209* (2013.01); *G09G 2320/0242* (2013.01)

(58) Field of Classification Search
CPC ............... G09G 3/3208; G09G 3/2074; G09G 2320/0209; G09G 2320/0242; G09G 3/2003; G09G 5/10; G09G 2320/0271
See application file for complete search history.

(56) References Cited

U.S. PATENT DOCUMENTS

2012/0112991 A1* 5/2012 Hashimoto .......... G09G 3/3426 345/89
2019/0082168 A1* 3/2019 Lee ........................ H04N 13/31

FOREIGN PATENT DOCUMENTS

| | | | |
|---|---|---|---|
| KR | 20070087288 | A | 8/2007 |
| KR | 101272367 | B1 | 6/2013 |
| KR | 101310935 | B1 | 9/2013 |
| KR | 20190116599 | A | 10/2019 |

* cited by examiner

*Primary Examiner* — Towfiq Elahi

(74) *Attorney, Agent, or Firm* — CANTOR COLBURN LLP

(57) ABSTRACT

A display device includes a display panel including a plurality of pixels, each of the plurality of pixels including a first color sub-pixel, a second color sub-pixel and a third color sub-pixel, and a panel driver configured to drive the display panel based on input image data. The panel driver stores a gamma curve characteristic to which a color cross-talk offset of the display panel is applied, detects mixed color pixels among the plurality of pixels by analyzing the input image data, determines a compensation coefficient for each of the mixed color pixels based on the input image data for each of the mixed color pixels, and compensates a luminance of each of the mixed color pixels based on the color crosstalk offset and the compensation coefficient.

17 Claims, 19 Drawing Sheets

FIG. 7

| IDATA | | | MIXED COLOR PIXEL |
|---|---|---|---|
| RSPD | GSPD | BSPD | |
| 255G | 255G | 255G | O |
| 0G | 200G | 200G | O |
| 0G | 0G | 255G | X |
| 70G | 48G | 21G | O |

FIG. 8

| IDATA | | | NORMALIZED IDATA | | | COMPENSATION COEFFICIENT |
|---|---|---|---|---|---|---|
| RSPD | GSPD | BSPD | NORMALIZED RSPD | NORMALIZED GSPD | NORMALIZED BSPD | |
| 255G | 255G | 255G | 1 | 1 | 1 | 1 |
| 25G | 25G | 25G | 1 | 1 | 1 | 1 |
| 0G | 127G | 127G | 0 | 1 | 1 | 0.66 |
| 64G | 0G | 23G | 1 | 0 | 0.5 | 0.5 |
| 25G | 25G | 0G | 1 | 1 | 0 | 0.66 |
| 70G | 48G | 21G | 1 | 0.69 | 0.3 | 0.66 |

FIG. 9

| IDATA | | | NORMALIZED IDATA | | | COMPENSATION COEFFICIENT (2:7:1 WEIGHTED AVERAGE) |
|---|---|---|---|---|---|---|
| RSPD | GSPD | BSPD | NORMALIZED RSPD | NORMALIZED GSPD | NORMALIZED BSPD | |
| 255G | 255G | 255G | 1 | 1 | 1 | 1 |
| 25G | 25G | 25G | 1 | 1 | 1 | 1 |
| 0G | 127G | 127G | 0 | 1 | 1 | 0.8 |
| 64G | 0G | 23G | 1 | 0 | 0.5 | 0.25 |
| 25G | 25G | 0G | 1 | 1 | 0 | 0.9 |
| 70G | 48G | 21G | 1 | 0.69 | 0.3 | 0.71 |

FIG. 14

| IDAT (R, G, B) | TARGET (L, x, y) | CCT_OFS = −5% NO COMPENSATION (L, x, y) | CCT_OFS = −5% CCT COMPENSATION (L, x, y) |
|---|---|---|---|
| (255G, 255G, 255G) | (2029, 0.282, 0.278) | (1928, 0.282, 0.278) | (2029, 0.282, 0.278) |
| (104G, 200G, 48G) | (892, 0.293, 0.625) | (847, 0.293, 0.625) | (873, 0.293, 0.625) |
| (56G, 56G, 1G) | (66, 0.437, 0.541) | (63, 0.437, 0.541) | (66, 0.437, 0.541) |

DISPLAY DEVICE AND METHOD OF OPERATING A DISPLAY DEVICE

This application claims priority to Korean Patent Application No. 10-2023-0023254, filed on Feb. 22, 2023, and all the benefits accruing therefrom under 35 USC § 119, the content of which in its entirety is herein incorporated by reference.

BACKGROUND

1. Field

The disclosure relates to a display device, and more particularly to a display device that compensates for a color crosstalk, and a method of operating the display device.

2. Description of the Related Art

A pixel of a display device, such as an organic light emitting diode (OLED) display device, may include sub-pixels that emit light of different colors, for example, a red sub-pixel, a green sub-pixel and a blue sub-pixel. In the display device, it is desirable that a white luminance when all of the red, green, and blue sub-pixels emit light is equal to a sum of a red luminance when the red sub-pixel emits light, a green luminance when the green sub-pixel emits light and a blue luminance when the blue sub-pixel emits light. However, a voltage (e.g., an initialization voltage) applied to a first sub-pixel may be changed when a second sub-pixel adjacent to the first sub-pixel emits light, and thus a luminance of the first sub-pixel may be changed. Accordingly, a color crosstalk phenomenon in which the white luminance is different from the sum of the red, green, and blue luminance may occur.

SUMMARY

In an embodiment, a display device capable of compensating for color crosstalk is provided.

In an embodiment, a method of operating a display device capable of compensating for color crosstalk is provided.

According to an embodiment, there is provided a display device including a display panel having a plurality of pixels, each of the plurality of pixels including a first color sub-pixel, a second color sub-pixel and a third color sub-pixel, and a panel driver configured to drive the display panel based on input image data. The panel driver stores a gamma curve characteristic to which a color crosstalk offset of the display panel is applied, detects mixed color pixels among the plurality of pixels by analyzing the input image data, determines a compensation coefficient for each of the mixed color pixels based on the input image data for each of the mixed color pixels, and compensates a luminance of each of the mixed color pixels based on the color crosstalk offset and the compensation coefficient.

In an embodiment, color crosstalk values of the display panel may be calculated at respective gray levels, and the color crosstalk offset may be determined based on an average of the color crosstalk values.

In an embodiment, the color crosstalk value at each gray level may be determined based on an equation "CCT=(LW−LR−LG−LB)/LW*100", where CCT denotes the color crosstalk value, LW denotes a white luminance of the display panel when all of the first, second and third color sub-pixels emit light, LR denotes a first color luminance of the display panel when the first color sub-pixel emits light, LG denotes a second color luminance of the display panel when the second color sub-pixel emits light, and LB denotes a third color luminance of the display panel when the third color sub-pixel emits light.

In an embodiment, the color crosstalk offset may correspond to a difference between a reference color crosstalk value and the average of the color crosstalk values.

In an embodiment, color crosstalk values of the display panel may be calculated at gray levels greater than or equal to a reference gray level, and the color crosstalk offset may be determined based on an average of the color crosstalk values at the gray levels that are greater than or equal to the reference gray level.

In an embodiment, entire gray levels may be divided into gray regions, an average of color crosstalk values of the display panel may be calculated in each of the gray regions, and the color crosstalk offset may be determined based on the average of the color crosstalk values in each of the gray regions.

In an embodiment, when the color crosstalk offset has a negative value, the gamma curve characteristic may decrease by an amount of the color crosstalk offset from a reference gamma curve characteristic. When the color crosstalk offset has a positive value, the gamma curve characteristic may increase by an amount of the color crosstalk offset from the reference gamma curve characteristic.

In an embodiment, the input image data for each of the plurality of pixels may include first color sub-pixel data for the first color sub-pixel, second color sub-pixel data for the second color sub-pixel, and third color sub-pixel data for the third color sub-pixel. The panel driver may determine a first pixel among the plurality of pixels as the mixed color pixel when at least two of the first color sub-pixel data, the second color sub-pixel data and the third color sub-pixel data for the first pixel represent a non-zero gray level.

In an embodiment, the panel driver may normalize the first, second and third color sub-pixel data for the mixed color pixel such that a maximum sub-pixel data among the first, second and third color sub-pixel data for the mixed color pixel has a value of 1, and may determine an average of the normalized first, second and third color sub-pixel data as the compensation coefficient of the mixed color pixel.

In an embodiment, the panel driver may normalize the first, second and third color sub-pixel data for the mixed color pixel such that a maximum sub-pixel data among the first, second and third color sub-pixel data for the mixed color pixel has a value of 1, may calculate a weighted average of the first, second and third color sub-pixel data by applying weights to the normalized first, second and third color sub-pixel data, and may determine the weighted average of the first, second and third color sub-pixel data as the compensation coefficient of the mixed color pixel.

In an embodiment, when the color crosstalk offset has a negative value, the panel driver may increase the luminance of each of the mixed color pixels by a product of an amount of the color crosstalk offset and the compensation coefficient. When the color crosstalk offset has a positive value, the panel driver may decrease the luminance of each of the mixed color pixels by a product of an amount of the color crosstalk offset and the compensation coefficient.

In an embodiment, the panel driver may include a gamma characteristic storage configured to store the gamma curve characteristic to which the color crosstalk offset is applied, a controller configured to receive the input image data, to detect the mixed color pixels among the plurality of pixels, to determine the compensation coefficient of each of the mixed color pixels, and to generate output image data based on the input image data, the color crosstalk offset and the compensation coefficient, and a data driver configured to provide data signals to the plurality of pixels based on the output image data.

In an embodiment, the controller may search for an original luminance corresponding to an input gray level represented by the input image data for each of the mixed color pixels in the gamma curve characteristic, may determine a target luminance by adjusting the original luminance by a product of an amount of the color crosstalk offset and the compensation coefficient, and may generate the output image data representing an output gray level for each of the mixed color pixels by searching for the output gray level corresponding to the target luminance in the gamma curve characteristic.

In an embodiment, the gamma characteristic storage may include a plurality of input gray-output gray lookup tables respectively corresponding to a plurality of corrected gamma curve characteristics that are compensated based on a plurality of compensation coefficients.

In an embodiment, the controller may select an input gray-output gray lookup table corresponding to the compensation coefficient of each of the mixed color pixels from among the plurality of input gray-output gray lookup tables, may determine an output gray level corresponding to an input gray level represented by the input image data for each of the mixed color pixels using the selected input gray-output gray lookup table, and may generate the output image data representing the output gray level for each of the mixed color pixels.

In an embodiment, the gamma characteristic storage may include a plurality of input gray-output gray lookup tables respectively corresponding to a plurality of reference corrected gamma curve characteristics that are compensated based on a plurality of reference compensation coefficients.

In an embodiment, the controller may select two input gray-output gray lookup tables corresponding to two reference compensation coefficients adjacent to the compensation coefficient of each of the mixed color pixels from among the plurality of input gray-output gray lookup tables, may determine two output gray levels corresponding to an input gray level represented by the input image data for each of the mixed color pixels in the selected two input gray-output gray lookup tables, and may generate the output image data representing an interpolated output gray level for each of the mixed color pixels by interpolating the two output gray levels.

According to an embodiment, there is provided a method of operating a display device including a plurality of pixels. Each of the plurality of pixels includes a first color sub-pixel, a second color sub-pixel and a third color sub-pixel. In the method, a gamma curve characteristic to which a color crosstalk offset of a display panel of the display device is applied is stored, input image data are received, mixed color pixels are detected among the plurality of pixels by analyzing the input image data, a compensation coefficient of each of the mixed color pixels is determined based on the input image data for each of the mixed color pixels, and the luminance of each of the mixed color pixels is compensated based on the color crosstalk offset and the compensation coefficient.

In an embodiment, to compensate the luminance of each of the mixed color pixels, an original luminance corresponding to an input gray level represented by the input image data for each of the mixed color pixels may be searched for in the gamma curve characteristic, a target luminance may be determined by adjusting the original luminance by a product of an amount of the color crosstalk offset and the compensation coefficient, an output gray level corresponding to the target luminance may be searched for in the gamma curve characteristic, and the display panel may be driven based on output image data representing the output gray level for each of the mixed color pixels.

In an embodiment, to store the gamma curve characteristic to which the color crosstalk offset is applied, a plurality of input gray-output gray lookup tables respectively corresponding to a plurality of corrected gamma curve characteristics that are compensated based on a plurality of compensation coefficients may be stored. To compensate the luminance of each of the mixed color pixels, an input gray-output gray lookup table corresponding to the compensation coefficient of each of the mixed color pixels may be selected from among the plurality of input gray-output gray lookup tables, an output gray level corresponding to an input gray level represented by the input image data for each of the mixed color pixels may be determined using the selected input gray-output gray lookup table, and the display panel may be driven based on output image data representing the output gray level for each of the mixed color pixels.

As described above, in a display device and a method of operating the display device according to an embodiment, a gamma curve characteristic to which a color crosstalk offset of a display panel is applied may be stored, mixed color pixels may be detected by analyzing input image data, a compensation coefficient for each of the mixed color pixels may be determined based on the input image data for each of the mixed color pixels, and the luminance of each of the mixed color pixels may be compensated based on the color crosstalk offset and the compensation coefficient. Accordingly, a color crosstalk of the display device may be compensated.

BRIEF DESCRIPTION OF THE DRAWINGS

Illustrative, non-limiting embodiments will be more clearly understood from the following detailed description in conjunction with the accompanying drawings. The above and other features of embodiments will become apparent by describing in detail embodiments thereof with reference to the accompanying drawings.

FIG. 7 is a table for describing an example where mixed color pixels are detected according to an embodiment.

FIG. 8 is a table for describing an example where compensation coefficients of mixed color pixels are determined according to an embodiment.

FIG. 9 is a table for describing another example where compensation coefficients of mixed color pixels are determined according to an embodiment.

FIG. 14 is a table illustrating example of the luminance and a color coordinate in a case where a color crosstalk is not compensated and in a case where the color crosstalk is compensated according to an embodiment.

DETAILED DESCRIPTION OF THE EMBODIMENTS

Figure 1:
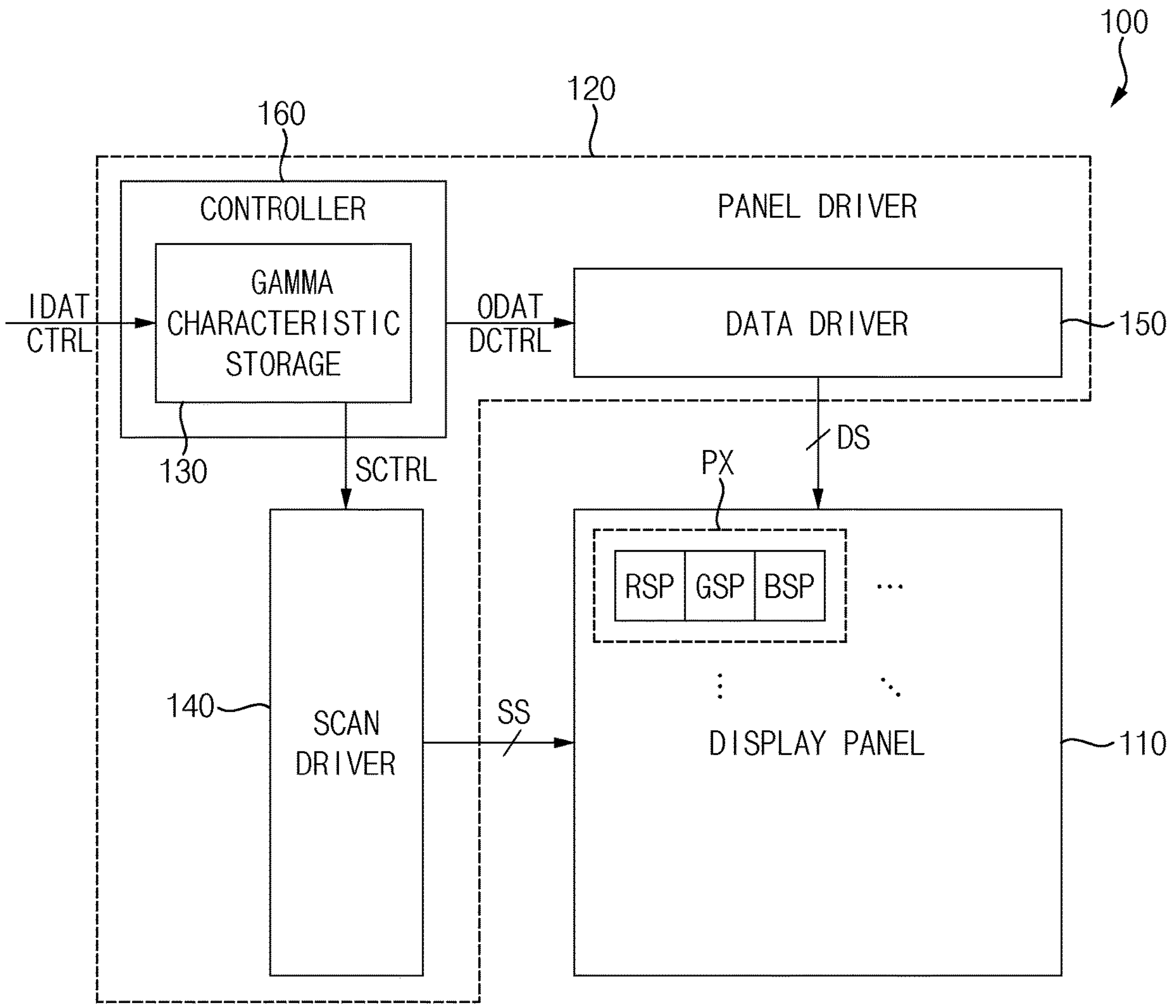
FIG. 1 is a schematic block diagram illustrating a display device according to an embodiment.

Hereinafter, embodiments of the invention will be explained in detail with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art, where like reference numerals refer to like elements throughout.

FIG. 1 is a schematic block diagram illustrating a display device according to an embodiment.

Referring to FIG. 1, a display device 100 according to an embodiment may include a display panel 110 that includes a plurality of pixels PX, and a panel driver 120 that drives the display panel 110 based on input image data IDAT. In an embodiment, the panel driver 120 may include a gamma characteristic storage 130, a scan driver 140 that provides scan signals SS to the plurality of pixels PX, a data driver 150 that provides data signals DS to the plurality of pixels PX, and a controller 160 that controls an operation of the display device 100.

The display panel 110 may include a plurality of data lines, a plurality of scan lines, and the plurality of pixels PX that are connected to the plurality of data lines and the plurality of scan lines. Each pixel PX may include a first color sub-pixel RSP, a second color sub-pixel GSP, and a third color sub-pixel BSP that emit light of different colors. In an embodiment, each pixel PX may include a red sub-pixel RSP emitting red light, a green sub-pixel GSP emitting green light, and a blue sub-pixel BSP emitting blue light. Further, in an embodiment, each of the first, second and third color sub-pixels RSP, GSP and BSP, respectively, may include at least two transistors, at least one capacitor and a light emitting element, and the display panel 110 may be a light emitting display panel. For example, the light emitting element may be an organic light emitting diode (OLED), and the display panel 110 may be an OLED display panel. In other examples, the light emitting element may be a nano light emitting diode (NED), a quantum dot (QD) light emitting diode, a micro light emitting diode, an inorganic light emitting diode, and/or any other suitable light emitting element. However, the display panel 110 is not limited to the light emitting display panel and may be any suitable display panel.

In an embodiment, the gamma characteristic storage 130 may store a gamma curve characteristic (e.g., a gamma curve characteristic 320 illustrated in FIG. 4 or a gamma curve characteristic 370 illustrated in FIG. 6) to which a color crosstalk offset of the display panel 110 is applied. In an embodiment, the gamma characteristic storage 130 may store the gamma curve characteristic in the form of a gray-luminance lookup table, and the gray-luminance lookup table may be referred to as a gamma lookup table (LUT). Further, in an embodiment, the gamma characteristic storage 130 may store a first gamma curve characteristic for the first color sub-pixel RSP, a second gamma curve characteristic for the second color sub-pixel GSP, and a third gamma curve characteristic for the third color sub-pixel BSP.

In an embodiment, color crosstalk values of the display panel 110 may be at the entire gray levels (e.g., a 0-gray level to a 255-gray level), and the color crosstalk offset may be determined based on an average of the color crosstalk values. In other embodiments, color crosstalk values of the display panel 110 may be calculated at gray levels greater than or equal to a reference gray level (e.g., a 10-gray level), and the color crosstalk offset may be determined based on an average of the color crosstalk values at the gray levels greater than or equal to the reference gray level. In still other embodiments, the entire gray levels may be divided into gray regions each including two or more consecutive gray levels, an average of color crosstalk values of the display panel may be calculated in each of the gray regions, and the color crosstalk offset may be determined based on the average of the color crosstalk values in each of the gray regions. Here, applying the color crosstalk offset to the gamma curve characteristic may mean that the gamma curve characteristic decreases by an amount (or an absolute value) of the color crosstalk offset from a reference gamma curve characteristic (e.g., a gamma curve characteristic having a gamma value of about 2.2) when the color crosstalk offset has a negative value, and may mean that the gamma curve characteristic increases by the amount of the color crosstalk offset from the reference gamma curve characteristic when the color crosstalk offset has a positive value.

In an embodiment, the scan driver 140 may generate the scan signals SS based on a scan control signal SCTRL received from the controller 160, and may sequentially provide the scan signals SS to the plurality of pixels PX on a row basis. In an embodiment, the scan control signal SCTRL may include a start signal and a clock signal, but is not limited thereto. In an embodiment, the scan driver 140 may be integrated or formed in the display panel 110. In other embodiments, the scan driver 140 may be implemented as one or more integrated circuits.

In an embodiment, the data driver 150 may generate the data signals DS based on output image data ODAT and a data control signal DCTRL received from the controller 160, and may provide the data signals DS to the plurality of pixels PX. In an embodiment, the data control signal DCTRL may include an output data enable signal, a horizontal start signal and/or a load signal, but is not limited thereto. In an embodiment, the data driver 150 may be implemented as one or more integrated circuits. In other embodiments, the data driver 150 and the controller 160 may be implemented with a single integrated circuit, and the single integrated circuit may be referred to as a timing controller embedded data driver (TED) integrated circuit.

In an embodiment, the controller 160 (e.g., a timing controller (TCON)) may receive the input image data IDAT and a control signal CTRL from an external host device (e.g., a graphics processing unit (GPU), an application processor (AP) or a graphics card). In an embodiment, the control signal CTRL may include a vertical synchronization signal, a horizontal synchronization signal, an input data enable signal, a master clock signal, etc., but is not limited thereto. The controller 160 may generate the output image data ODAT, the data control signal DCTRL and the scan control signal SCTRL based on the input image data IDAT and the control signal CTRL. The controller 160 may control an operation of the scan driver 140 by providing the scan control signal SCTRL to the scan driver 140 and may control an operation of the data driver 150 by providing the output image data ODAT and the data control signal DCTRL to the data driver 150.

In the display device 100 according to an embodiment, the controller 160 of the panel driver 120 may detect mixed color pixels among the plurality of pixels PX by analyzing the input image data IDAT. For example, the input image data IDAT for each pixel PX may include first color sub-pixel data for the first color sub-pixel RSP, second color sub-pixel data for the second color sub-pixel GSP and third color sub-pixel data for the third color sub-pixel BSP, and the controller 160 may determine a pixel PX for which at least two of the first, second and third color sub-pixel data represent a non-zero gray level as the mixed color pixel.

Further, in an embodiment, the controller 160 of the panel driver 120 may determine a compensation coefficient for each mixed color pixel based on the input image data IDAT for each mixed color pixel. In an embodiment, the controller 160 may normalize the first, second and third color sub-pixel data for the mixed color pixel such that a maximum sub-pixel data among the first, second and third color sub-pixel data has a value of 1, and may determine an average of the normalized first, second and third color sub-pixel data as the compensation coefficient of the mixed color pixel. In other embodiments, the controller 160 may normalize the first, second and third color sub-pixel data for the mixed color pixel, may calculate a weighted average of the first, second and third color sub-pixel data by applying weights (e.g., weights of 2:7:1) to the normalized first, second and third color sub-pixel data, and may determine the weighted average of the first, second and third color sub-pixel data as the compensation coefficient of the mixed color pixel.

In an embodiment, the panel driver 120 may compensate the luminance of each mixed color pixel based on the color crosstalk offset and the compensation coefficient. In an embodiment, the panel driver 120 may adjust the luminance of each mixed color pixel by a product of an amount (or an absolute value) of the color crosstalk offset and the compensation coefficient. For example, the panel driver 120 may increase the luminance of each mixed color pixel by the product of the amount of the color crosstalk offset and the compensation coefficient when the color crosstalk offset has a negative value, and may decrease the luminance of each mixed color pixel by the product of the amount of the color crosstalk offset and the compensation coefficient when the color crosstalk offset has a positive value.

As described above, in the display device 100 according to an embodiment, the gamma curve characteristic to which the color crosstalk offset of the display panel 110 is applied may be stored, the mixed color pixels may be detected by analyzing the input image data IDAT, the compensation coefficient of each mixed color pixel may be determined based on the input image data IDAT for each mixed color pixel, and the luminance of each mixed color pixel may be compensated based on the color crosstalk offset and the compensation coefficient. Thus, a single color pixel among the plurality of pixels PX may emit light with an original luminance corresponding to the gamma curve characteristic to which the color crosstalk offset is applied, and the mixed color pixel among the plurality of pixels PX may emit light with a luminance that is compensated from the original luminance based on the color crosstalk offset and the compensation coefficient. Accordingly, in the display device 100 according to an embodiment, a white luminance when all of the first, second and third color sub-pixels RSP, GSP, and BSP emit light may be substantially equal to a sum of a first color luminance when the first color sub-pixel RSP emits light, a second color luminance when the second color sub-pixel GSP emits light and a third color luminance when the third color sub-pixel BSP emits light, and a color crosstalk of the display device 100 may be compensated for.

Figure 2:
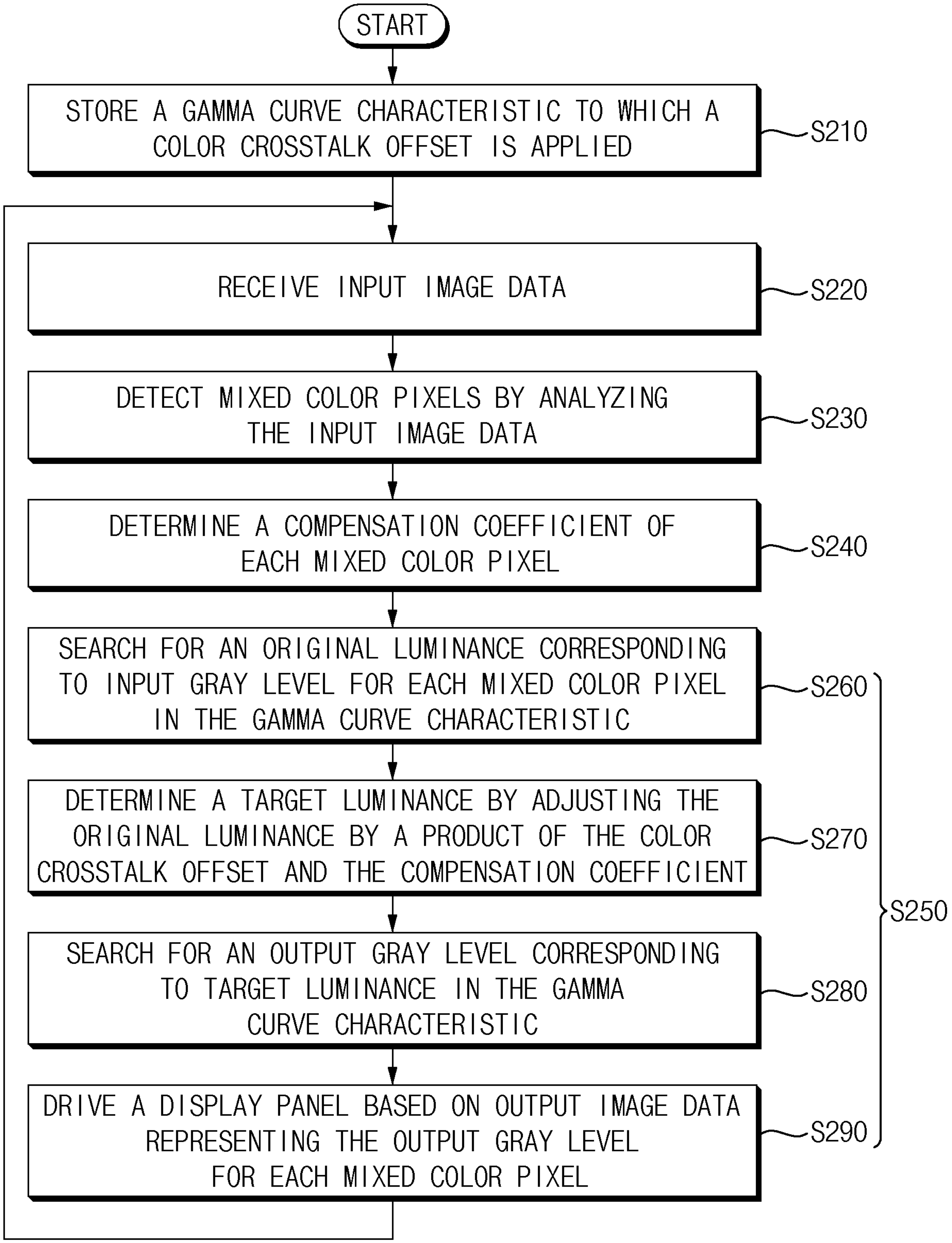
FIG. 2 is a flowchart illustrating a method of operating a display device according to an embodiment.
Figure 3:
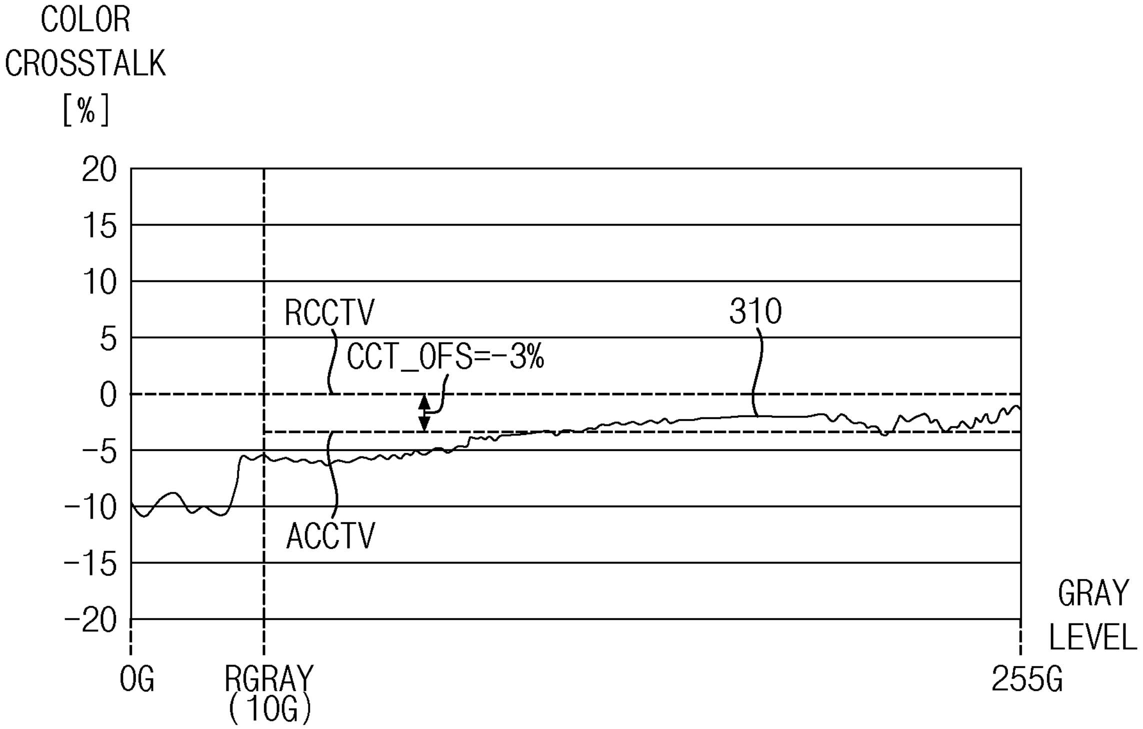
FIG. 3 is a graph illustrating an example of a color crosstalk offset of a display panel according to an embodiment.
Figure 4:
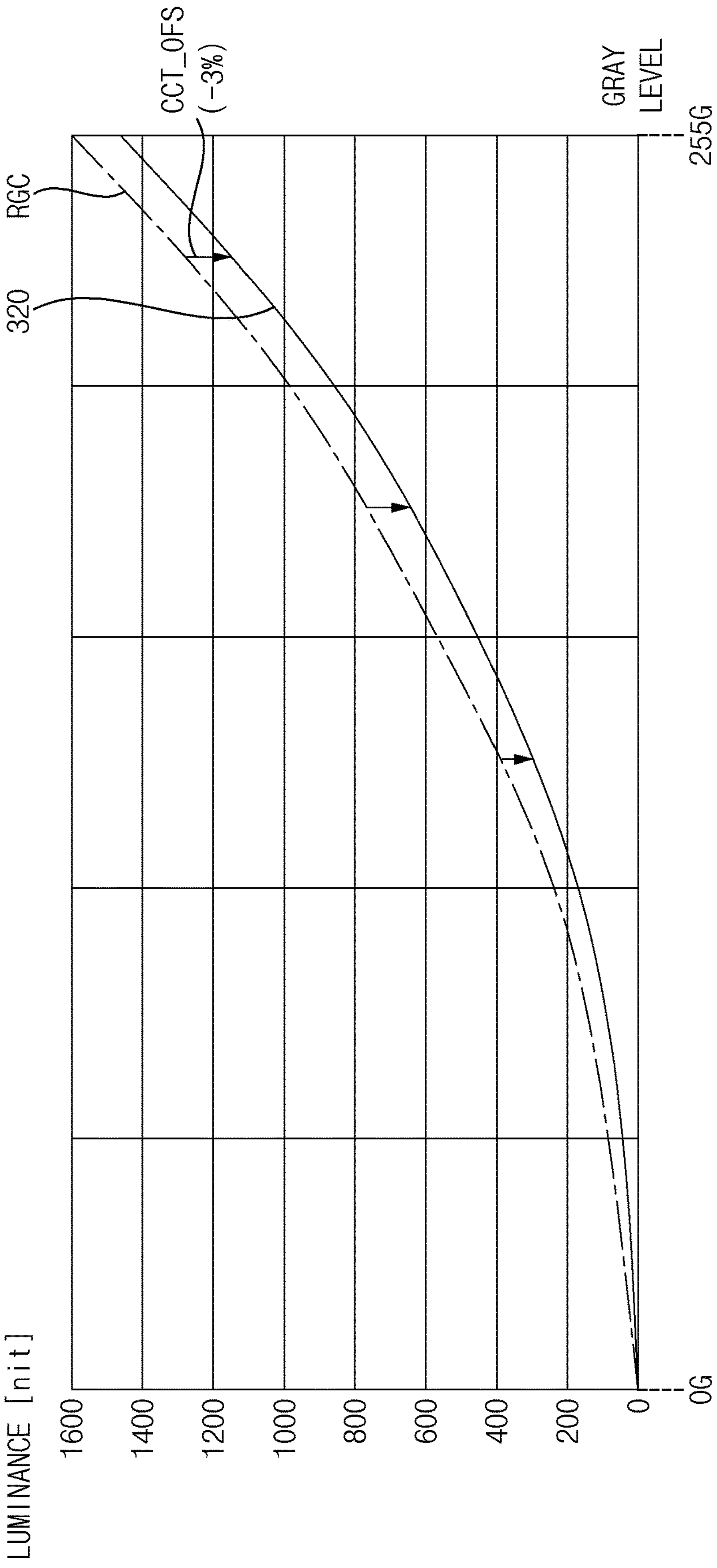
FIG. 4 is a graph illustrating an example of a gamma curve characteristic to which a color crosstalk offset of FIG. 3 is applied according to an embodiment.
Figure 5:
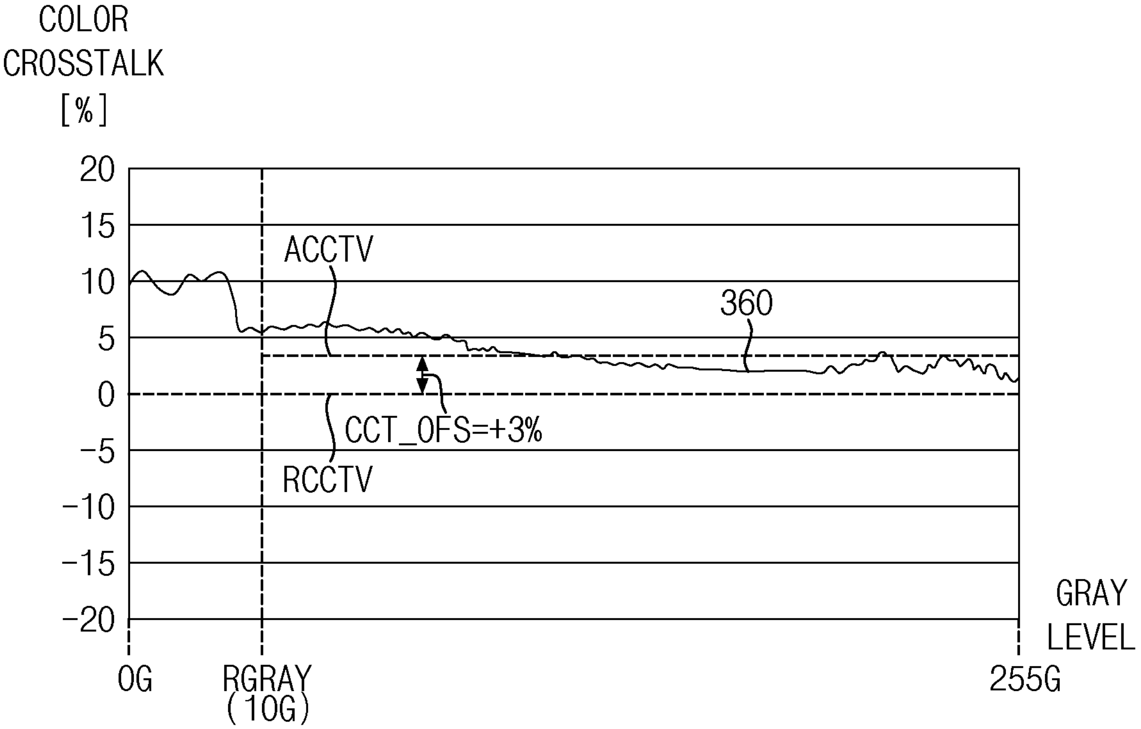
FIG. 5 is a graph illustrating another example of a color crosstalk offset of a display panel according to an embodiment.
Figure 6:
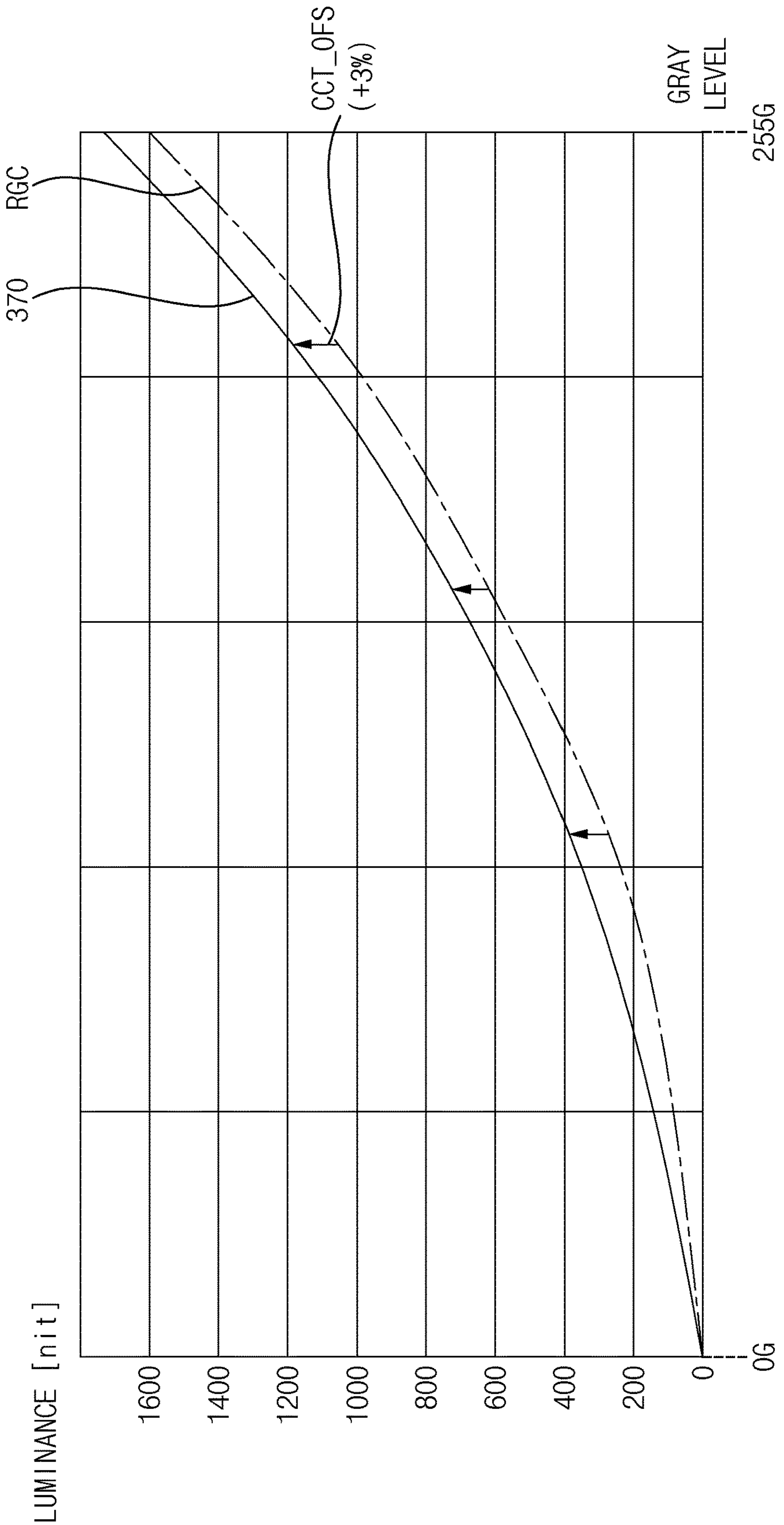
FIG. 6 is a graph illustrating an example of a gamma curve characteristic to which a color crosstalk offset of FIG. 5 is applied according to an embodiment.
Figure 10:
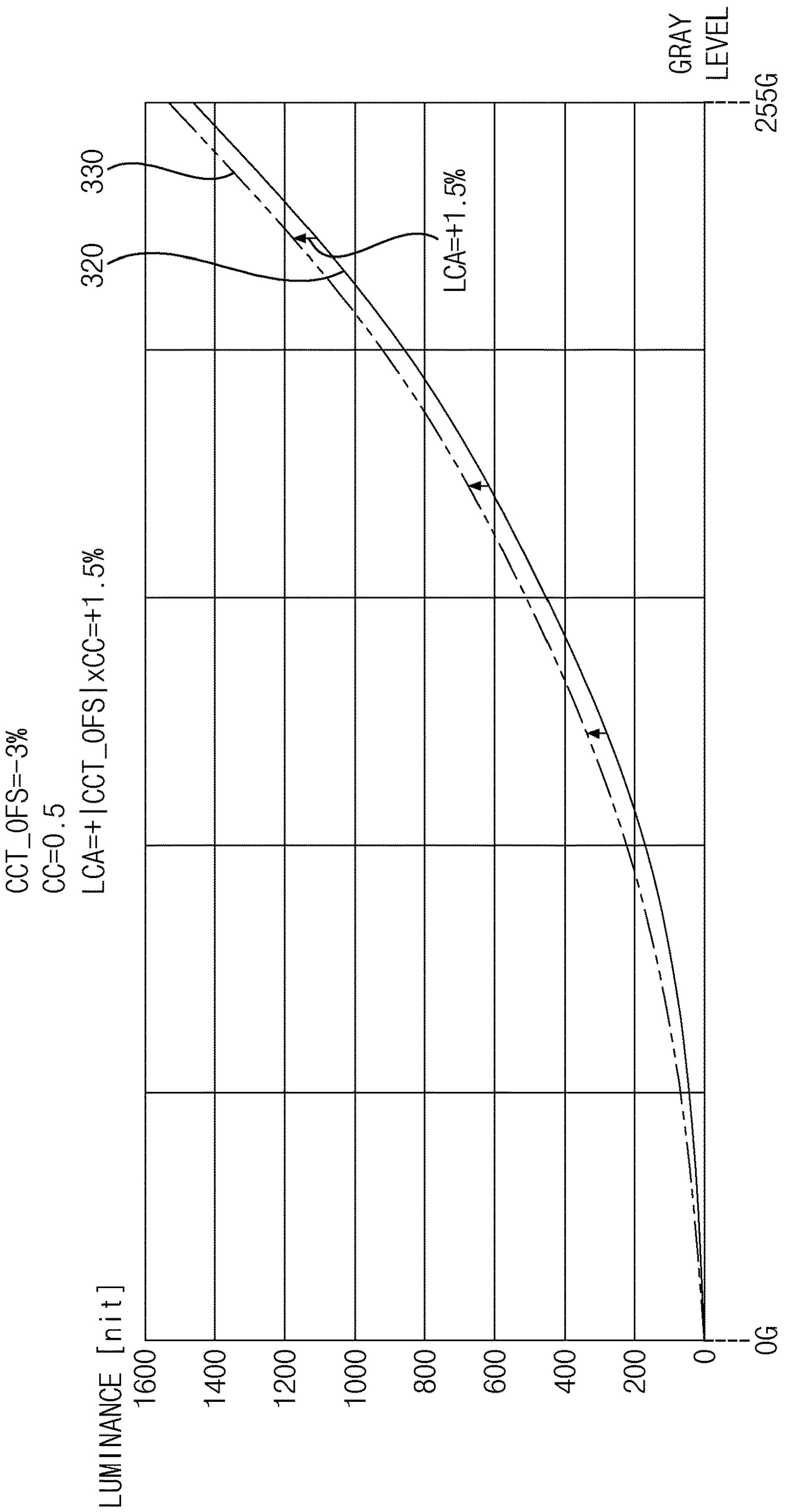
FIG. 10 is a graph for describing an example where the luminance of a mixed color pixel is compensated in a display device having the gamma curve characteristic of FIG. 4 according to an embodiment.
Figure 11:
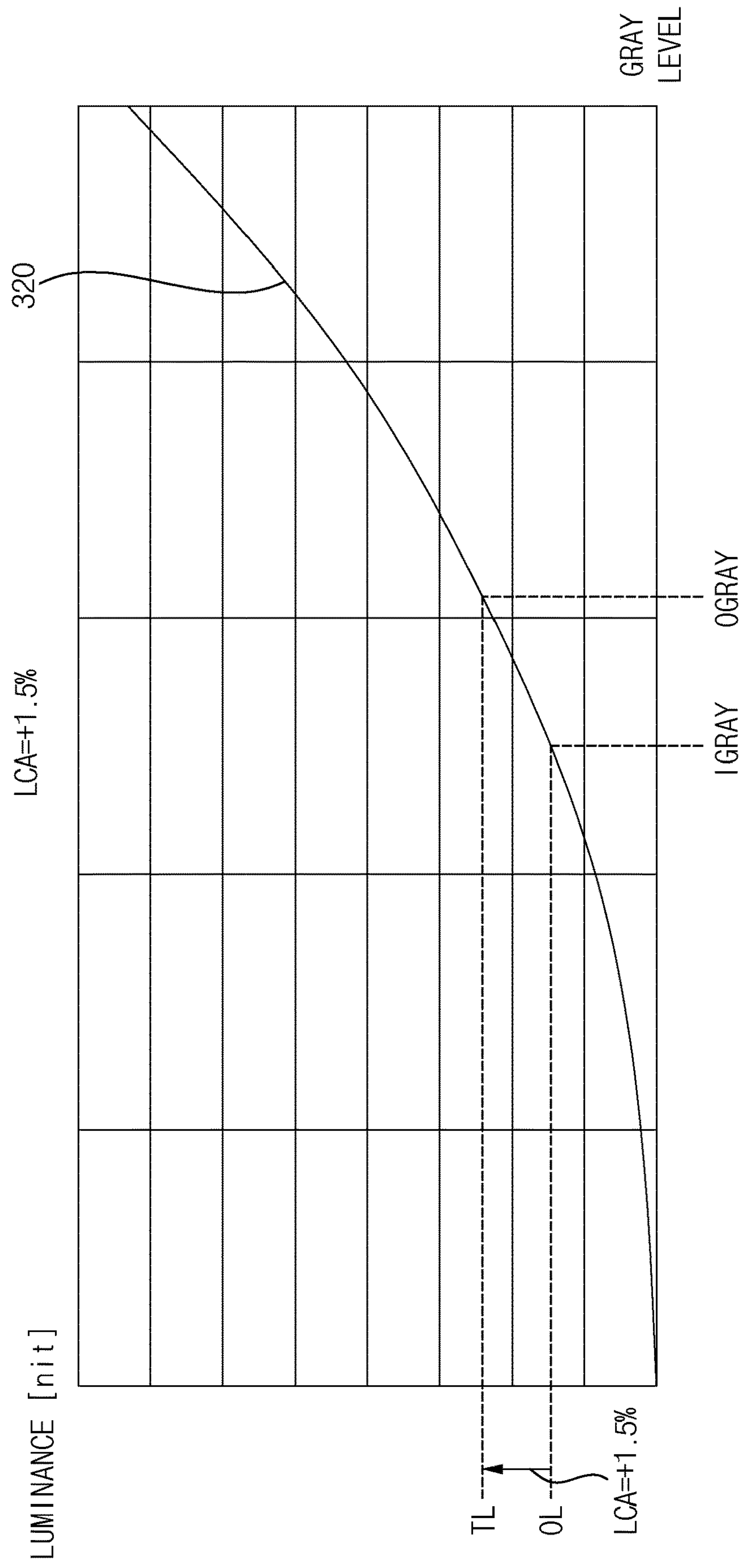
FIG. 11 is a graph for describing an example of determining an output gray level of a mixed color pixel to compensate for the luminance of the mixed color pixel as illustrated in FIG. 10 according to an embodiment.
Figure 12:
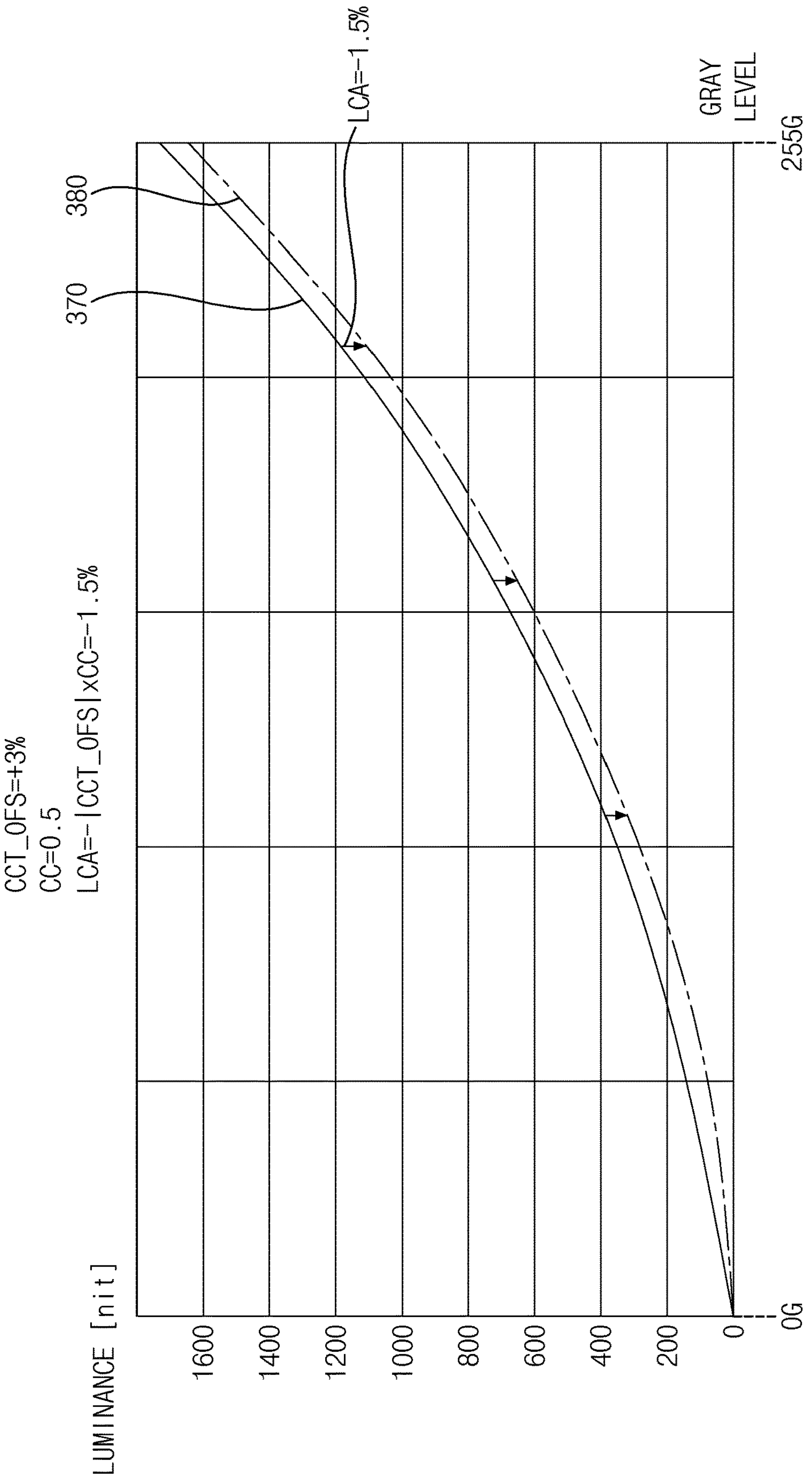
FIG. 12 is a graph for describing an example where the luminance of a mixed color pixel is compensated in a display device having a gamma curve characteristic of FIG. 6 according to an embodiment.
Figure 13:
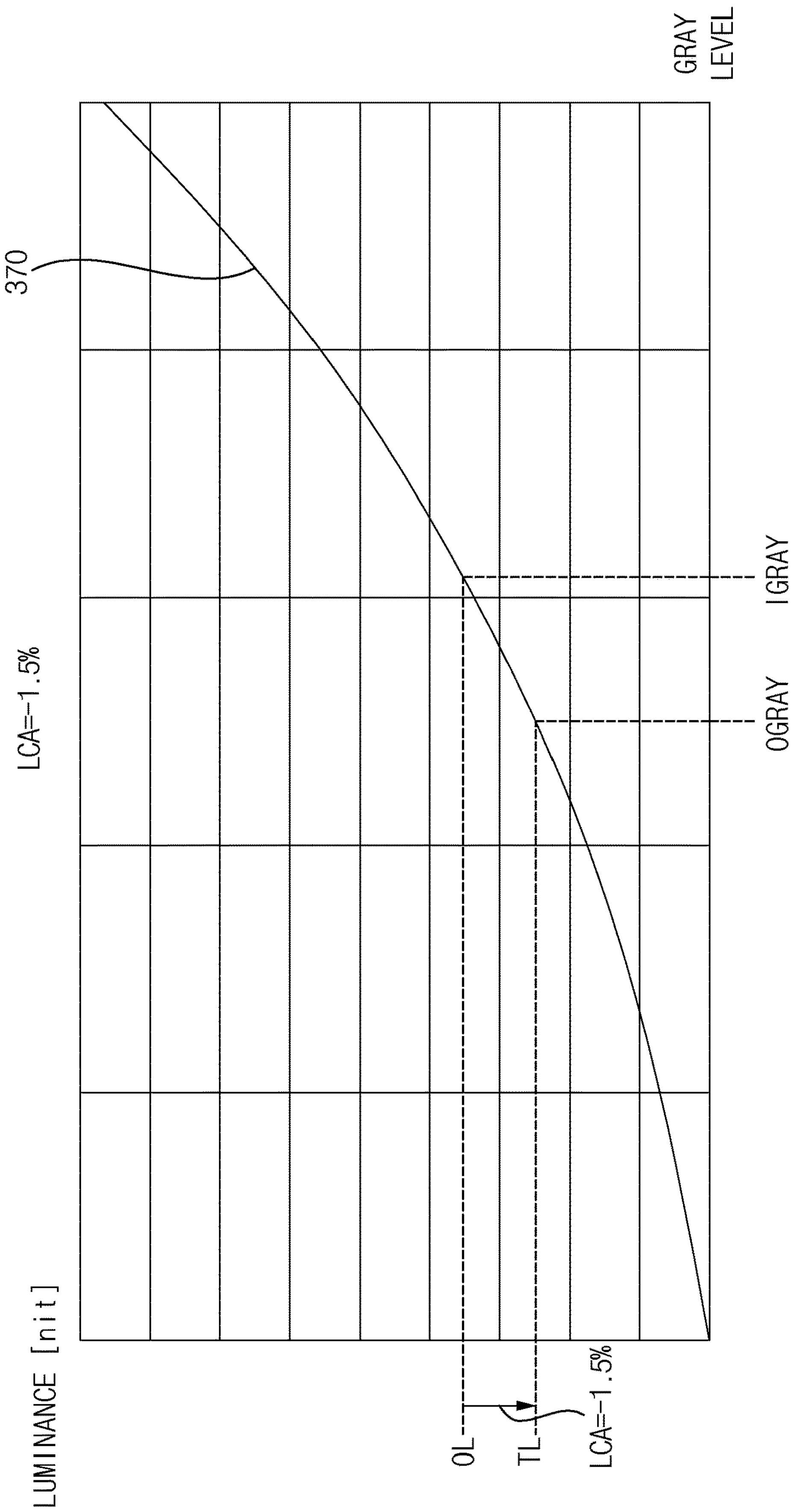
FIG. 13 is a graph for describing an example of determining an output gray level of a mixed color pixel to compensate for the luminance of the mixed color pixel as illustrated in FIG. 12 according to an embodiment.

In an embodiment, FIG. 2 is a flowchart illustrating a method of operating a display device, FIG. 3 is a graph illustrating an example of a color crosstalk offset of a display panel, FIG. 4 is a graph illustrating an example of a gamma curve characteristic to which a color crosstalk offset of FIG. 3 is applied, FIG. 5 is a graph illustrating another example of a color crosstalk offset of a display panel, FIG. 6 is a graph illustrating an example of a gamma curve characteristic to which a color crosstalk offset of FIG. 5 is applied, FIG. 7 is a table for describing an example where mixed color pixels are detected, FIG. 8 is a table for describing an example where compensation coefficients of mixed color pixels are determined, FIG. 9 is a table for describing another example where compensation coefficients of mixed color pixels are determined, FIG. 10 is a graph for describing an example where the luminance of a mixed color pixel is compensated in a display device having a gamma curve characteristic of FIG. 4, FIG. 11 is a graph for describing an example of determining an output gray level of a mixed color pixel to compensate for the luminance of the mixed color pixel as illustrated in FIG. 10, FIG. 12 is a graph for describing an example where the luminance of a mixed color pixel is compensated in a display device having a gamma curve characteristic of FIG. 6, FIG. 13 is a graph for describing an example of determining an output gray level of a mixed color pixel to compensate for the luminance of the mixed color pixel as illustrated in FIG. 12, and FIG. 14 is a table illustrating an example of a luminance and a color coordinate in a case where a color crosstalk is not compensated and in a case where the color crosstalk is compensated according to an embodiment.

Referring to FIGS. 1 and 2, in a method of operating a display device 100 according to an embodiment, a gamma characteristic storage 130 of a panel driver 120 may store a gamma curve characteristic to which a color crosstalk offset of a display panel 110 is applied (S210). For example, the gamma characteristic storage 130 may store the gamma curve characteristic in the form of a gray-luminance lookup table.

As illustrated in FIGS. 3 and 5, color crosstalk values 310 and 360 of the display panel 110 may be calculated at respective gray levels. For example, the color crosstalk value 310 and 360 at each gray level may be determined based on an equation "CCT=(LW−LR−LG−LB)/LW*100". Here, CCT denotes the color crosstalk value 310 and 360, LW denotes a white luminance of the display panel 110 when all of first, second and third color sub-pixels RSP, GSP and BSP emit light, LR denotes the first color luminance (e.g., a red luminance) of the display panel 110 when the first color sub-pixel RSP emits light, LG denotes the second color luminance (e.g., a green luminance) of the display panel 110 when the second color sub-pixel GSP emits light, and LB denotes the third color luminance (e.g., a blue luminance) of the display panel 110 when the third color sub-pixel BSP emits light.

Further, in an embodiment, the color crosstalk offset CCT_OFS may be determined based on an average of the color crosstalk values 310 and 360 in the entire gray levels (e.g., a 0-gray level 0 G to a 255-gray level 255 G). In other embodiments, as illustrated in FIGS. 3 and 5, the color crosstalk offset CCT_OFS may be determined based on an average ACCTV of the color crosstalk values 310 and 360 at gray levels greater than or equal to a reference gray level RGRAY (e.g., a 10-gray level 10 G). Further, in an embodiment, the color crosstalk offset CCT_OFS may correspond to a difference between a reference color crosstalk value RCCTV and the average ACCTV of the color crosstalk values 310 and 360. For example, the reference color crosstalk value RCCTV may be about 0%, and the color crosstalk offset CCT_OFS may be determined as the average ACCTV of the color crosstalk values 310 and 360.

In still other embodiments, the entire gray levels (e.g., the 0-gray level 0 G to the 255-gray level 255 G) may be divided into gray regions, an average of color crosstalk values 310 and 360 of the display panel 110 may be calculated in each of the gray regions, and the color crosstalk offset CCT_OFS may be determined based on the average of the color crosstalk values 310 and 360 in each of the gray regions.

Further, in an embodiment, when the color crosstalk offset CCT_OFS has a negative value (e.g., about-3%) as illustrated in FIG. 3, then as illustrated in FIG. 4, the gamma curve characteristic 320 to which the color crosstalk offset CCT_OFS is applied may be decreased by an amount (or an absolute value) of the color crosstalk offset CCT_OFS from a reference gamma curve characteristic RGC. For example, the reference gamma curve characteristic RGC may be a gamma curve characteristic having a gamma value of about 2.2, but is not limited thereto. Alternatively, when the color crosstalk offset CCT_OFS has a positive value (e.g., about +3%) as illustrated in FIG. 5, then as illustrated in FIG. 6, the gamma curve characteristic 370 to which the color crosstalk offset CCT_OFS is applied may be increased by the amount (or the absolute value) of the color crosstalk offset CCT_OFS from the reference gamma curve characteristic RGC.

In an embodiment, a controller 160 of the panel driver 120 may receive input image data IDAT from an external host device (S220), and may detect mixed color pixels among a plurality of pixels PX of the display panel 110 by analyzing the input image data IDAT (S230). In an embodiment, as illustrated in FIG. 7, the input image data IDAT for each pixel PX may include first color sub-pixel data RSPD for the first color sub-pixel RSP, second color sub-pixel data GSPD for the second color sub-pixel GSP and third color sub-pixel data BSPD for the third color sub-pixel BSP. The controller 160 may determine a first pixel as the mixed color pixel when at least two of the first, second and third color sub-pixel data RSPD, GSPD and BSPD, respectively, for the first pixel represent a non-zero gray level, and may determine a second pixel as a single color pixel when at least two of the first, second and third color sub-pixel data RSPD, GSPD and BSPD, respectively, for the first pixel represent a zero gray level. In the example of FIG. 7, a pixel PX for which the first, second and third color sub-pixel data RSPD, GSPD and BSPD, respectively, represent a 255-gray level 255 G, the 255-gray level 255 G and the 255-gray level 255 G, respectively, may be determined as the mixed color pixel, a pixel PX for which the first, second and third color sub-pixel data RSPD, GSPD and BSPD represent a 0-gray level 0 G, a 200-gray level 200 G and the 200-gray level 200 G may be determined as the mixed color pixel, a pixel PX for which the first, second and third color sub-pixel data RSPD, GSPD and BSPD represent the 0-gray level 0 G, the 0-gray level 0 G and the 255-gray level 255 G may be determined as the single color pixel, and a pixel PX for which the first, second and third color sub-pixel data RSPD, GSPD and BSPD represent a 70-gray level 70 G, a 48-gray level 48 G and a 21-gray level 21 G may be determined as the mixed color pixel.

Further, in an embodiment, the controller 160 of the panel driver 120 may determine a compensation coefficient of each mixed color pixel based on the input image data IDAT for each mixed color pixel (S240).

In an embodiment, as illustrated in FIG. 8, the controller 160 may normalize the first, second and third color sub-pixel data RSPD, GSPD and BSPD for the mixed color pixel such that a maximum sub-pixel data among the first, second and third color sub-pixel data RSPD, GSPD and BSPD, respectively, for the mixed color pixel has a value of 1, and may determine an average of the normalized first, second and third color sub-pixel data NORMALIZED RSPD, NORMALIZED GSPD and NORMALIZED BSPD, respectively, as the compensation coefficient of the mixed color pixel. For example, when the first, second and third color sub-pixel data RSPD, GSPD and BSPD, respectively, represent a 255-gray level 255 G, the 255-gray level 255 G and the 255-gray level 255 G, respectively, or represent a 25-gray level 25 G, the 25-gray level 25 G and the 25-gray level 25 G, respectively, the first, second and third color sub-pixel data RSPD, GSPD and BSPD, respectively, may be normalized to a value of about 1, a value of about 1 and a value of about 1, respectively, and the compensation coefficient may be determined to be about 1. Further, the first, second and third color sub-pixel data RSPD, GSPD and BSPD, respectively, representing a 0-gray level 0 G, a 127-gray level 127 G and the 127-gray level 127 G, respectively, may be normalized to a value of about 0, a value of about 1 and a value of about 1, and the compensation coefficient may be determined to be about 0.66. Further, the first, second and third color sub-pixel data RSPD, GSPD and BSPD, respectively, representing a 64-gray level 64 G, the 0-gray level 0 G and a 23-gray level 23 G, respectively, may be normalized to a value of about 1, a value of about 0 and a value of about 0.5, respectively, and the compensation coefficient may be determined to be about 0.5. Further, the first, second and third color sub-pixel data RSPD, GSPD and BSPD, respectively, representing the 25-gray level 25 G, the 25-gray level 25 G and the 0-gray level 0 G, respectively, may be normalized to a value of about 1, a value of about 1 and a value of about 0, respectively, and the compensation coefficient may be determined to be about 0.66. Further, the first, second and third color sub-pixel data RSPD, GSPD and BSPD, respectively, representing a 70-gray level 70 G, a 48-gray level 48 G and a 21-gray level 21 G, respectively, may be normalized to a value of about 1, a value of about 0.69 and a value of about 0.3, respectively, and the compensation coefficient may be determined to be about 0.66.

In an embodiment, as illustrated in FIG. 9, the controller 160 may normalize the first, second and third color sub-pixel data RSPD, GSPD and BSPD, respectively, for the mixed color pixel such that a maximum sub-pixel data among the first, second and third color sub-pixel data RSPD, GSPD and BSPD, respectively, for the mixed color pixel has a value of about 1, may calculate a weighted average of the first, second and third color sub-pixel data RSPD, GSPD and BSPD, respectively, by applying weights (e.g., weights of about 2:7:1) to the normalized first, second and third color sub-pixel data NORMALIZED RSPD, NORMALIZED GSPD and NORMALIZED BSPD, respectively, and may determine the weighted average of the first, second and third color sub-pixel data RSPD, GSPD and BSPD, respectively, as the compensation coefficient of the mixed color pixel. For example, the weights for the normalized first, second and third color sub-pixel data NORMALIZED RSPD, NORMALIZED GSPD and NORMALIZED BSPD, respectively, may be about 2:7:1, the compensation coefficient for the first, second and third color sub-pixel data RSPD, GSPD and BSPD, respectively, representing the 255-gray level 255 G, the 255-gray level 255 G and the 255-gray level 255 G, respectively, or representing the 25-gray level 25 G, the 25-gray level 25 G and the 25-gray level 25 G, respectively, may be determined to be about 1, the compensation coefficient for the first, second and third color sub-pixel data RSPD, GSPD and BSPD, respectively, representing the 0-gray level 0 G, the 127-gray level 127 G and the 127-gray level 127 G, respectively, may be determined to be about 0.8, the compensation coefficient for the first, second and third color sub-pixel data RSPD, GSPD and BSPD, respectively, representing the 64-gray level 64 G, the 0-gray level 0 G and the 23-gray level 23 G, respectively, may be determined to be about 0.25, the compensation coefficient for the first, second and third color sub-pixel data RSPD, GSPD and BSPD, respectively, representing the 25-gray level 25 G, the 25-gray level 25 G and the 0-gray level 0 G, respectively, may be determined to be about 0.9, and the compensation coefficient for the first, second and third color sub-pixel data RSPD, GSPD and BSPD, respectively, representing the 70-gray level 70 G, the 48-gray level 48 G and the 21-gray level 21 G, respectively, may be determined to be about 0.71.

In an embodiment, the panel driver 120 may compensate the luminance of each mixed color pixel based on the color crosstalk offset CCT_OFS and the compensation coefficient (S250). In an embodiment, the panel driver 120 may adjust the luminance of each mixed color pixel by a product of an amount of the color crosstalk offset CCT_OFS and the compensation coefficient.

In an embodiment, when the color crosstalk offset CCT_OFS has the negative value (e.g., about-3%) as illustrated in FIG. 3, then as illustrated in FIG. 10, the panel driver 120 may increase the luminance of each mixed color pixel corresponding to the gamma curve characteristic 320 illustrated in FIG. 4 by a luminance compensation amount LCA corresponding to a product of an amount (or an absolute value) of the color crosstalk offset CCT_OFS and the compensation coefficient CC. For example, when the color crosstalk offset CCT_OFS is about-3% and the compensation coefficient CC of the mixed color pixel is about 0.5, the panel driver 120 may increase the luminance of the mixed color pixel by about 1.5%. That is, the gamma curve characteristic 330 for the mixed color pixel having the compensation coefficient CC of about 0.5 may be increased by about 1.5% from the gamma curve characteristic 320 before compensation.

Further, in an embodiment, when the color crosstalk offset CCT_OFS has the positive value (e.g., about +3%) as illustrated in FIG. 5, then as illustrated in FIG. 12, the panel driver 120 may decrease the luminance of each mixed color pixel corresponding to the gamma curve characteristic 370 illustrated in FIG. 6 by a luminance compensation amount LCA corresponding to a product of an amount (or an absolute value) of the color crosstalk offset CCT_OFS and the compensation coefficient CC. For example, when the color crosstalk offset CCT_OFS is about +3% and the compensation coefficient CC of the mixed color pixel is about 0.5, the panel driver 120 may decrease the luminance of the mixed color pixel by about 1.5%. That is, the gamma curve characteristic 380 for the mixed color pixel having the compensation coefficient CC of about 0.5 may be decreased by about 1.5% from the gamma curve characteristic 370 before compensation.

In an embodiment, to compensate the luminance of each mixed color pixel (S250), the controller 160 may search for an original luminance corresponding to an input gray level represented by the input image data IDAT for the mixed color pixel in the gamma curve characteristic 320 and 370 stored in the gamma characteristic storage 130 (S260), may determine a target luminance by adjusting the original luminance by a product of an amount of the color crosstalk offset CCT_OFS and the compensation coefficient CC (S270), and may search for an output gray level corresponding to the target luminance in the gamma curve characteristic 320 and 370 (S280). Further, the controller 160 may generate output image data ODAT representing the output gray level for the mixed color pixel, and a data driver 150 of the panel driver 120 may provide a data signal DS corresponding to the output image data ODAT to the mixed color pixel. Thus, the display panel 110 may be driven based on the output image data ODAT representing the output gray level for the mixed color pixel (S290).

For example, in an embodiment, when the color crosstalk offset CCT_OFS has the negative value (e.g., about-3%) and the luminance compensation amount LCA for a mixed color pixel is about +1.5%, as illustrated in FIG. 11, the original luminance OL corresponding to the input gray level IGRAY of the input image data IDAT for the mixed color pixel may be searched for in the gamma curve characteristic 320, the target luminance TL may be determined by increasing the original luminance OL by about 1.5%, the output gray level OGRAY corresponding to the target luminance TL may be searched for in the gamma curve characteristic 320, and the mixed color pixel may be driven based on the output image data ODAT representing the output gray level OGRAY.

Further, in an embodiment, when the color crosstalk offset CCT_OFS has the positive value (e.g., about +3%) and the luminance compensation amount LCA for a mixed color pixel is about −1.5%, as illustrated in FIG. 13, the original luminance OL corresponding to the input gray level IGRAY of the input image data IDAT for the mixed color pixel may be searched for in the gamma curve characteristic 370, the target luminance TL may be determined by decreasing the original luminance OL by about 1.5%, the output gray level OGRAY corresponding to the target luminance TL may be searched for in the gamma curve characteristic 370, and the mixed color pixel may be driven based on the output image data ODAT representing the output gray level OGRAY.

Accordingly, in the method of operating the display device 100 according to an embodiment, a color crosstalk compensation operation described above may be performed, and an image quality of the display device 100 may be improved. For example, as shown in FIG. 14, when the display device 100 having the color crosstalk offset CCT_OFS of about-5% receives the input image data IDAT representing the 255-gray level 255 G, the 255-gray level 255 G and the 255-gray level 255 G with respect to the first color sub-pixel RSP, the second color sub-pixel GSP and the third color sub-pixel BSP, the display device 100 that does not perform the color crosstalk compensation operation may display an image with a luminance of about 1928 nit and a color coordinate of about (0.282, 0.278), but the display device 100 that performs the color crosstalk compensation operation according to an embodiment may display an image with a luminance of about 2029 nit and a color coordinate of about (0.282, 0.278). Thus, compared with the luminance and the color coordinate in a case where the color crosstalk compensation operation is not performed, the luminance and the color coordinate in a case where the color crosstalk compensation operation is performed may be relatively close to (or substantially the same as) a target luminance of 2029 and a target color coordinate of about (0.282, 0.278) (e.g., a target luminance and a target color coordinate of a gamma curve characteristic having a gamma value of about 2.2) corresponding to the input image data IDAT representing the 255-gray level 255 G, the 255-gray level 255 G and the 255-gray level 255 G. Further, in the case where the color crosstalk compensation operation is performed, with respect to the input image data IDAT representing a 104-gray level 104 G, a 200-gray level 200 G and a 48-gray level 48 G corresponding to a target luminance of about 892 nit and a target color coordinate of about (0.293, 0.625), the luminance of the display device 100 may be improved from about 847 nit to about 873 nit, and the color coordinate of the display device 100 may be equal to the target color coordinate. In addition, in the case where the color crosstalk compensation operation is performed, with respect to the input image data IDAT representing a 56-gray level 56 G, the 56-gray level 56 G and a 1-gray level 1 G corresponding to a target luminance of about 63 nit and a target color coordinate of about (0.437, 0.541), the luminance of the display device 100 may be improved from about 63 nit to about 66 nit, and the color coordinate of the display device 100 may be equal to the target color coordinate.

Figure 15:
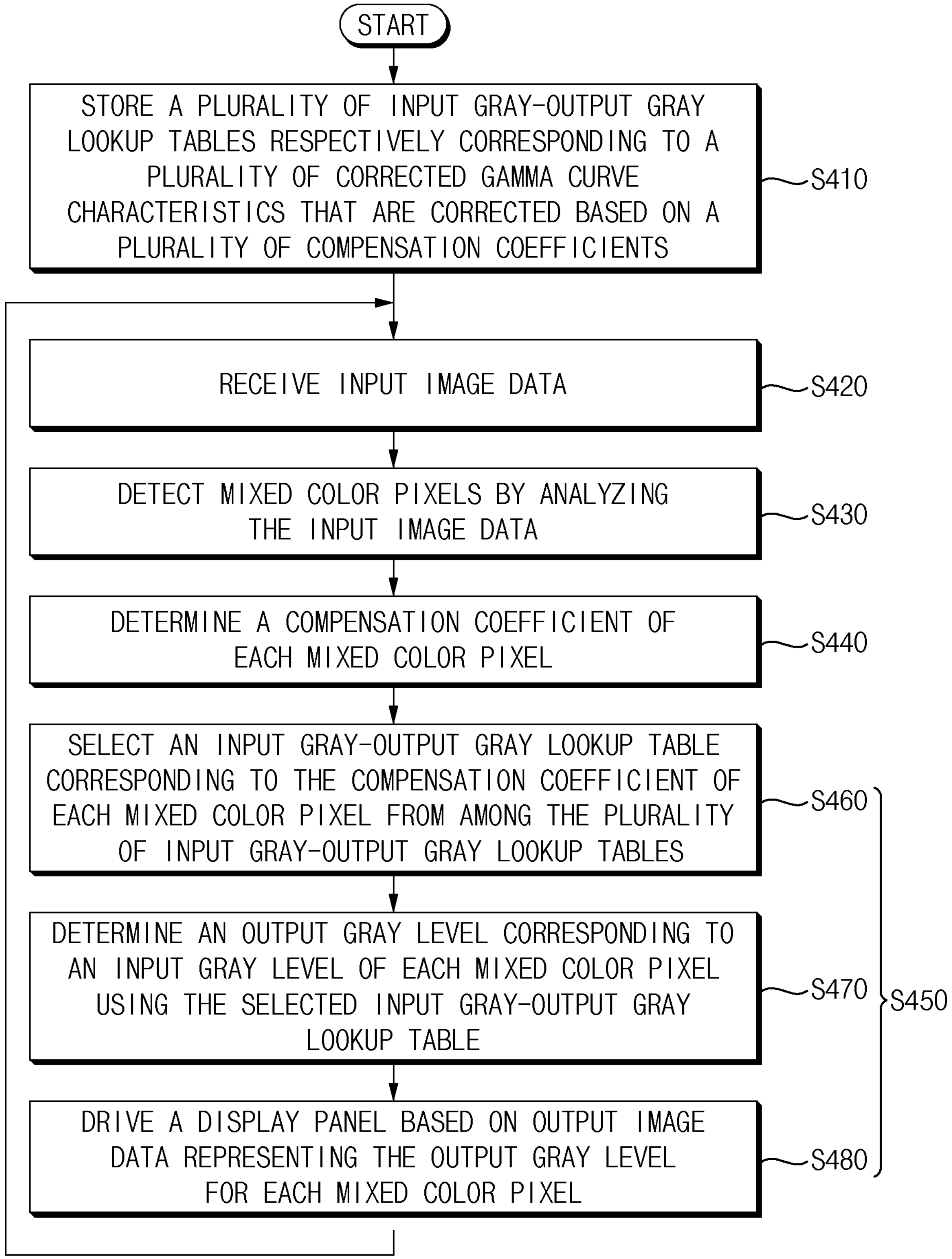
FIG. 15 is a flowchart illustrating a method of operating a display device according to an embodiment.
Figure 16:
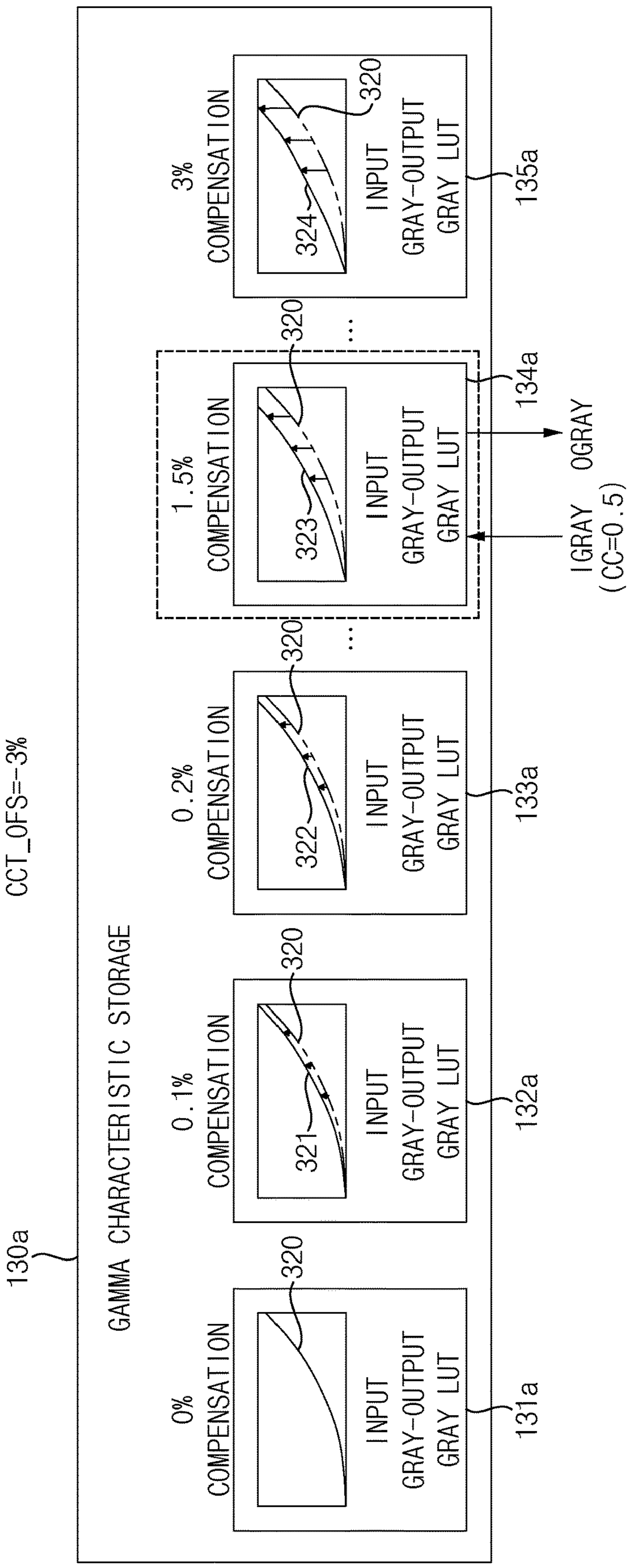
FIG. 16 is a graphical block diagram illustrating an example of a gamma characteristic storage of a display device according to an embodiment.

FIG. 15 is a flowchart illustrating a method of operating a display device according to an embodiment, and FIG. 16 is a graphical block diagram illustrating an example of a gamma characteristic storage of a display device according to an embodiment.

In an embodiment, a method of FIG. 15 may be substantially the same as a method of FIG. 2, except that the luminance of each mixed color pixel may be compensated using a plurality of input gray-output gray lookup tables respectively corresponding to a plurality of corrected gamma curve characteristics.

Referring to FIGS. 1 and 15, in the method of operating a display device 100 according to an embodiment, as illustrated in FIG. 16, a gamma characteristic storage 130*a* of a panel driver 120 may store the plurality of input gray-output gray lookup tables 131*a*, 132*a*, 133*a*, . . . , 134*a*, . . . , 135*a* respectively corresponding to a plurality of corrected gamma curve characteristics 320, 321, 322, . . . , 323, . . . , 324, that are compensated based on a plurality of compensation coefficients (S410).

For example, in an embodiment, when a color crosstalk offset CCT_OFS is about-3% as illustrated in FIG. 3, the gamma characteristic storage 130*a* may include the plurality of input gray-output gray lookup tables 131*a*, 132*a*, 133*a*, . . . , 134*a*, . . . , 135*a* respectively corresponding to the plurality of corrected gamma curve characteristics 320, 321, 322, . . . , 323, . . . , 324 on which color crosstalk compensation operations are performed at intervals of about 0.1% from the gamma curve characteristic 320 corresponding to the compensation coefficient of 0 illustrated in FIG. 4 to the corrected gamma curve characteristic 324 on which the color crosstalk compensation operation of about 3% is performed with the compensation coefficient of about 1. The plurality of corrected gamma curve characteristics 321, 322, . . . , 323, . . . , 324 may represent luminances that are gradually increased at intervals of about 0.1% from the gamma curve characteristic 320 illustrated in FIG. 4, but not are limited thereto.

In an embodiment, a controller 160 of the panel driver 120 may receive input image data IDAT from an external host device (S420), and may detect mixed color pixels among a plurality of pixels PX of a display panel 110 by analyzing the input image data IDAT (S430). The controller 160 of the panel driver 120 may determine a compensation coefficient for each mixed color pixel based on the input image data IDAT for each mixed color pixel (S440). The panel driver 120 may compensate the luminance of each mixed color pixel based on the color crosstalk offset CCT_OFS and the compensation coefficient (S450).

In an embodiment, to compensate the luminance of each mixed color pixel (S450), the controller 160 may select an input gray-output gray lookup table 134*a* corresponding to the compensation coefficient CC of the mixed color pixel from among the plurality of input gray-output gray lookup tables 131*a*, 132*a*, 133*a*, . . . , 134*a*, . . . , 135*a* (S460). For example, when the color crosstalk offset CCT_OFS is about-3% and the compensation coefficient CC is about 0.5, the controller 160 may select the input gray-output gray lookup table 134*a* corresponding to the corrected gamma curve characteristic 323 on which the color crosstalk compensation operation of about 1.5% is performed. Further, the controller 160 may determine an output gray level OGRAY corresponding to an input gray level IGRAY represented by the input image data IDAT for the mixed color pixel using the selected input gray-output gray lookup table 134*a* (S470). The controller 160 may generate output image data ODAT representing the output gray level with respect to the mixed color pixel, and a data driver 150 of the panel driver 120 may provide the mixed color pixel with a data signal DS corresponding to the output image data ODAT. That is, the display panel 110 may be driven based on the output image data ODAT representing the output gray level OGRAY for the mixed color pixel (S480).

Figure 17:
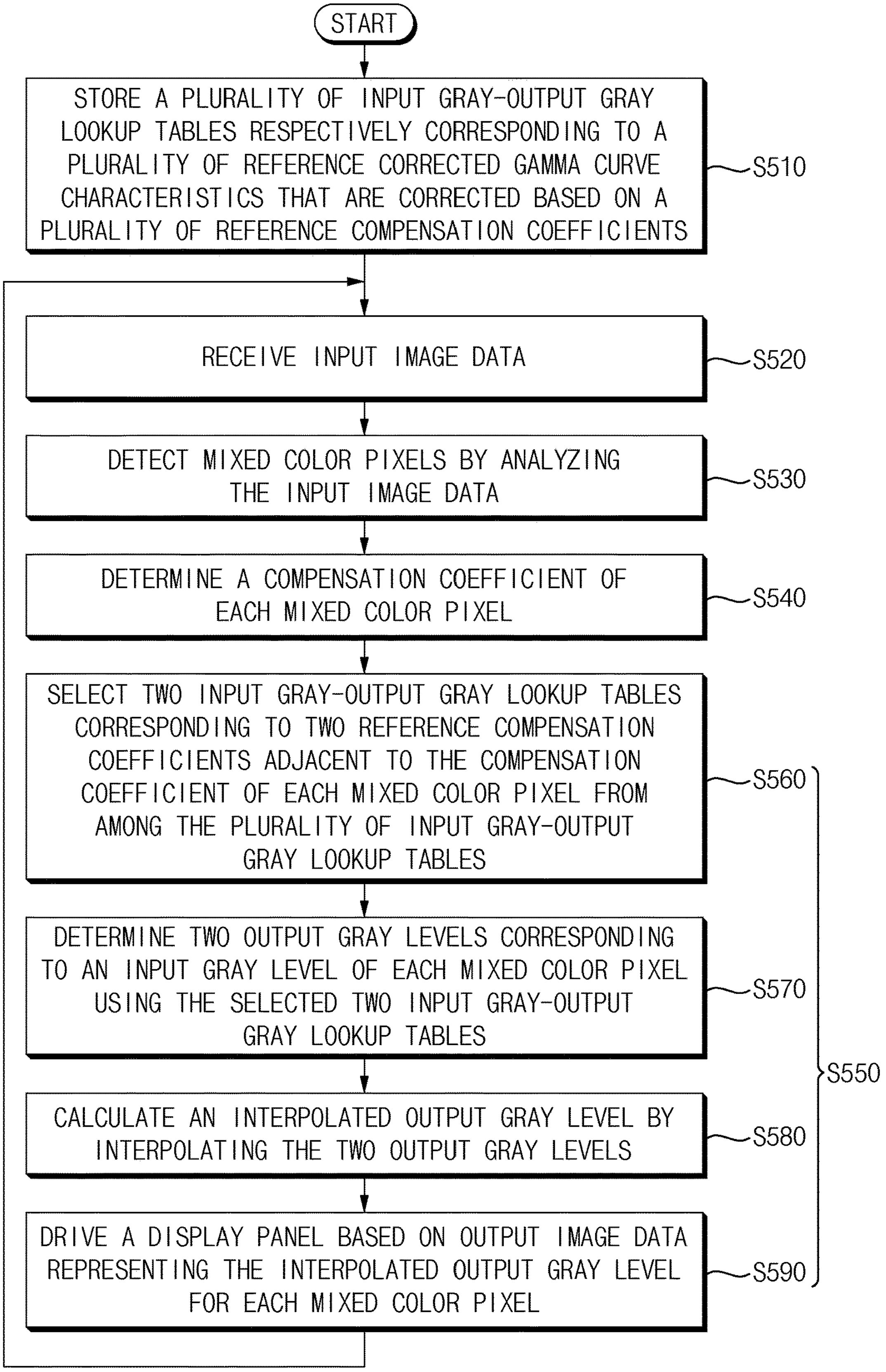
FIG. 17 is a flowchart illustrating a method of operating a display device according to an embodiment.
Figure 18:
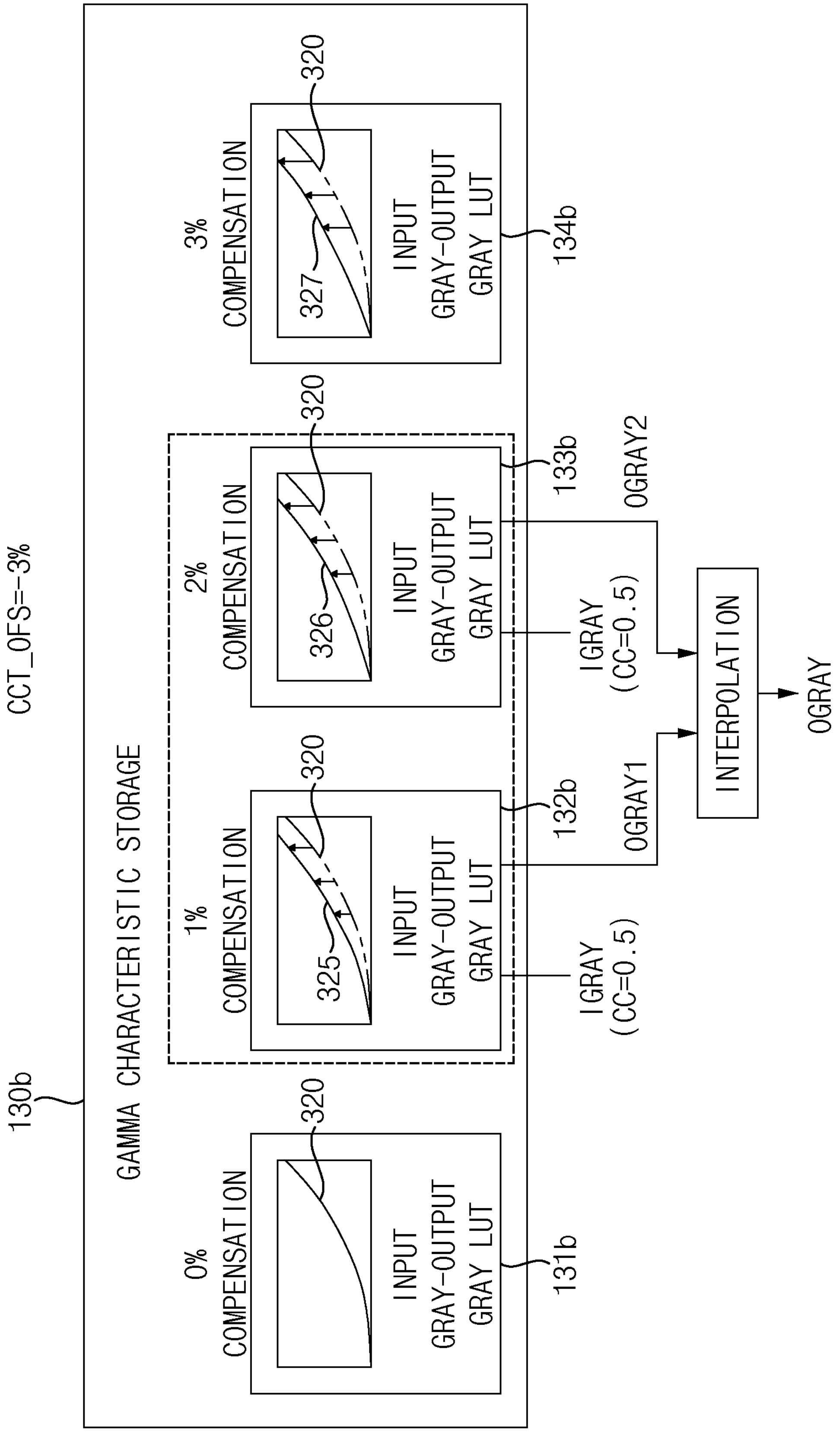
FIG. 18 is a graphical block diagram illustrating an example of a gamma characteristic storage of a display device according to an embodiment.

FIG. 17 is a flowchart illustrating a method of operating a display device according to an embodiment, and FIG. 18 is a graphical block diagram illustrating an example of a gamma characteristic storage of a display device according to an embodiment.

In an embodiment, a method of FIG. 17 may be substantially the same as a method of FIG. 2, except that the luminance of each mixed color pixel may be compensated using a plurality of input gray-output gray lookup tables respectively corresponding to a plurality of reference corrected gamma curve characteristics.

Referring to FIGS. 1 and 17, in the method of operating a display device 100 according to an embodiment, as illustrated in FIG. 18, a gamma characteristic storage 130*b* of a panel driver 120 may store the plurality of input gray-output gray lookup tables 131*b*, 132*b*, 133*b* and 134*b* respectively corresponding to the plurality of reference corrected gamma curve characteristics 320, 325, 326 and 327 that are compensated based on a plurality of reference compensation coefficients (S510).

In an embodiment, for example, the plurality of reference compensation coefficients may be about 0, about 0.33, about 0.66 and about 1, but are not limited thereto. Further, when a color crosstalk offset CCT_OFS is about-3% as illustrated in FIG. 3, the gamma characteristic storage 130*b* may include a first input gray-output gray lookup table 131*b* corresponding to the gamma curve characteristic 320 illustrated in FIG. 4 corresponding to the reference compensation coefficient of about 0, a second input gray-output gray lookup table 132*b* corresponding to the reference corrected gamma curve characteristic 325 on which a color crosstalk compensation operation of about 1% is performed with the reference compensation coefficient of about 0.33, a third input gray-output gray lookup table 133*b* corresponding to the reference corrected gamma curve characteristic 326 on which a color crosstalk compensation operation of about 2% is performed with the reference compensation coefficient of about 0.66, and a fourth input gray-output gray lookup table 134*b* corresponding to the reference corrected gamma curve characteristic 327 on which a color crosstalk compensation operation of about 3% is performed with the reference compensation coefficient of about 1.

In an embodiment, a controller 160 of the panel driver 120 may receive input image data IDAT from an external host device (S520), and may detect mixed color pixels among a plurality of pixels PX of a display panel 110 by analyzing the input image data IDAT (S530). The controller 160 of the panel driver 120 may determine a compensation coefficient for each mixed color pixel based on the input image data IDAT for each mixed color pixel (S540). The panel driver 120 may compensate the luminance of each mixed color pixel based on the color crosstalk offset CCT_OFS and the compensation coefficient (S550).

In an embodiment, to compensate the luminance of each mixed color pixel (S550), the controller 160 may select two input gray-output gray lookup tables 132*b* and 133*b* corresponding to two reference compensation coefficients adjacent to the compensation coefficient CC of the mixed color pixel from among the plurality of input gray-output gray lookup tables 131*b*, 132*b*, 133*b* and 134*b*, respectively (S560). For example, when the color crosstalk offset CCT_OFS is about-3% and the compensation coefficient CC is about 0.5, the controller 160 may select the second input gray-output gray lookup table 132*b* corresponding to the reference corrected gamma curve characteristic 325 on which the color crosstalk compensation operation of about 1% is performed with the reference compensation coefficient of about 0.33, and the third input gray-output gray lookup table 133*b* corresponding to the reference corrected gamma curve characteristic 326 on which the color crosstalk compensation operation of about 2% is performed with the reference compensation coefficient of about 0.66. Further, the controller 160 may determine two output gray levels OGRAY1 and OGRAY2 corresponding to an input gray level IDAT represented by the input image data IDAT for the mixed color pixel in the selected two input gray-output gray lookup tables 132*b* and 133*b* (S570). For example, the controller 160 may determine a first output gray level OGRAY1 corresponding to the input gray level IGRAY by using the second input gray-output gray lookup table 132*b*, and may determine the second output gray level OGRAY2 corresponding to the input gray level IGRAY by using third input gray-output gray lookup table 133*b*. The controller 160 may calculate interpolated output gray level OGRAY by interpolating the first and second output gray levels OGRAY1 and OGRAY2 (S580). Further, the controller 160 may generate output image data ODAT representing the interpolated output gray level OGRAY with respect to the mixed color pixel, and a data driver 150 of the panel driver 120 may provide the mixed color pixel with a data signal DS corresponding to the output image data ODAT. That is, the display panel 110 may be driven based on the output image data ODAT representing the output grayscale OGRAY for the mixed color pixel (S590).

Figure 19:
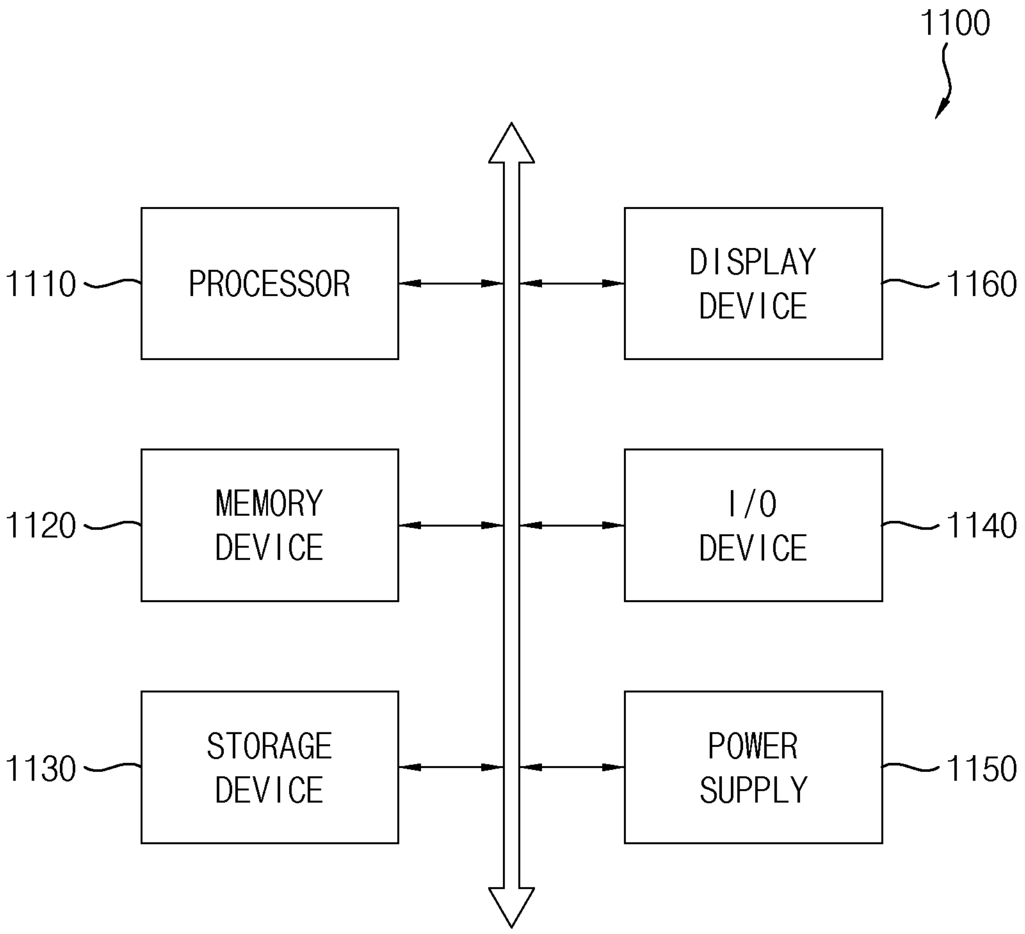
FIG. 19 is an operational block diagram illustrating an electronic device including a display device according to an embodiment.

FIG. 19 is a block diagram illustrating an electronic device including a display device according to an embodiment.

In an embodiment and referring to FIG. 19, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electronic devices, etc.

In an embodiment, the processor 1110 may perform various computing functions or tasks. The processor 1110 may be an application processor (AP), a micro-processor, a central processing unit (CPU), etc. The processor 1110 may be coupled to other components via an address bus, a control bus, a data bus, etc. Further, in an embodiment, the processor 1110 may be further coupled to an extended bus such as a peripheral component interconnection (PCI) bus.

In an embodiment, the memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

In an embodiment, the storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and/or an output device such as a printer, a speaker, etc. The power supply 1150 may supply power for operations of the electronic device 1100. The display device 1160 may be coupled to other components through the buses and/or other communication links.

In an embodiment, in the display device 1160, a gamma curve characteristic to which a color crosstalk offset of a display panel is applied may be stored, mixed color pixels may be detected by analyzing input image data, a compensation coefficient for each of the mixed color pixels may be determined based on the input image data for each of the mixed color pixels, and the luminance of each of the mixed color pixels may be compensated based on the color crosstalk offset and the compensation coefficient. Accordingly, a color crosstalk of the display device 1160 may be compensated.

In an embodiment, the invention may be applied to any electronic device 1100 including the display device 1160. For example, the invention may be applied to a television (TV), a digital TV, a 3D TV, a smart phone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, etc.

Figure 20:
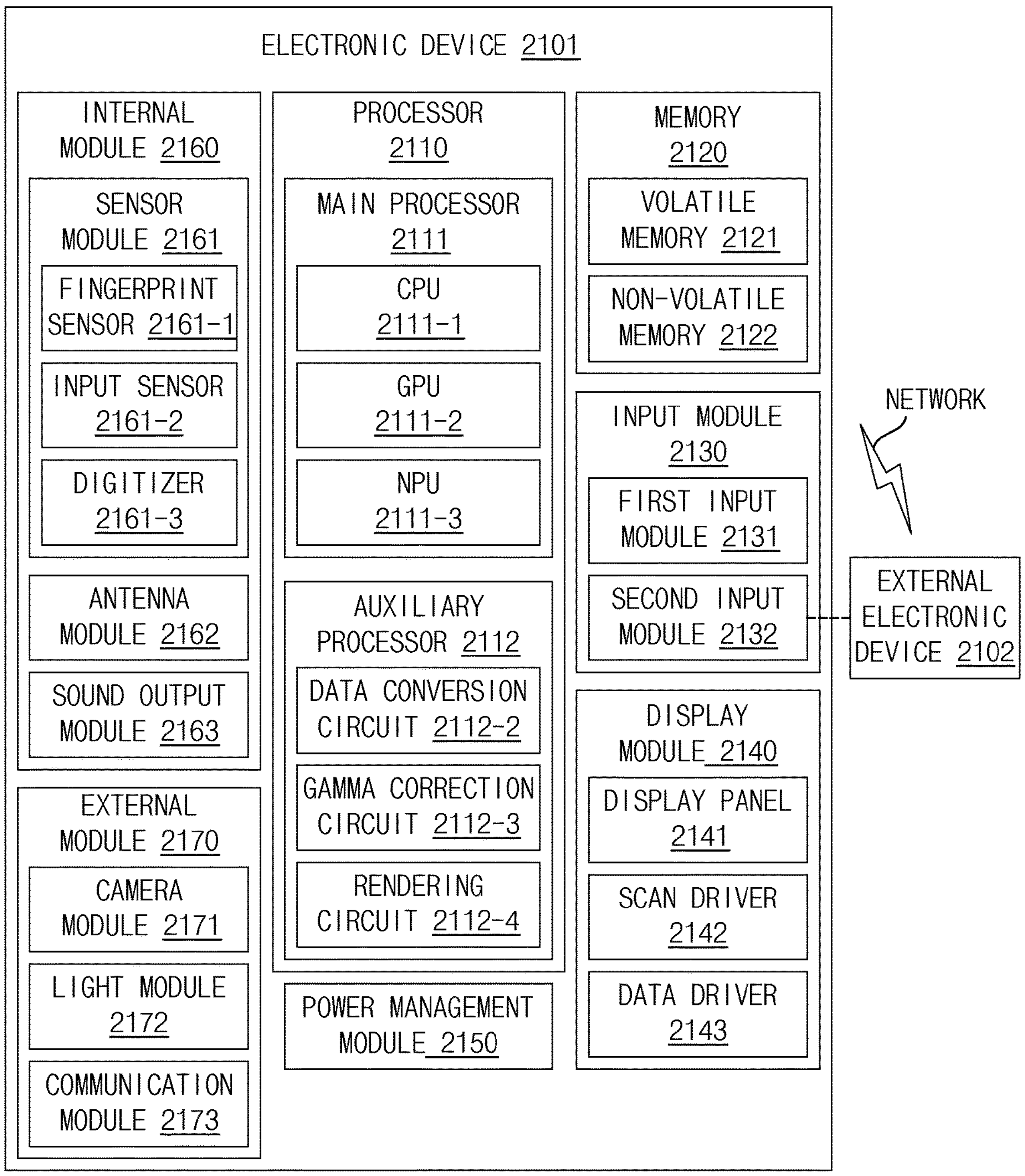
FIG. 20 is a schematic block diagram illustrating an example of an electronic device according to an embodiment.

FIG. 20 is a schematic block diagram illustrating an example of an electronic device according to an embodiment.

In an embodiment, an electronic device 2101 may output various information via a display module 2140 in an operating system. When a processor 2110 executes an application stored in a memory 2120, the display module 2140 may provide application information to a user via a display panel 2141.

In an embodiment, the processor 2110 may obtain an external input via an input module 2130 and/or a sensor module 2161 and may execute an application corresponding to the external input. For example, when the user selects a camera icon displayed on the display panel 2141, the processor 2110 may obtain a user input via an input sensor 2161-2 and may activate a camera module 2171. The processor 2110 may transfer image data corresponding to an image captured by the camera module 2171 to the display module 2140. The display module 2140 may display an image corresponding to the captured image via the display panel 2141.

In an embodiment, and as another example, when personal information authentication is executed in the display module 2140, a fingerprint sensor 2161-1 may obtain input fingerprint information as input data. The processor 2110 may compare the input data obtained by the fingerprint sensor 2161-1 with authentication data stored in the memory 2120, and may execute an application according to the comparison result. The display module 2140 may display information executed according to application logic via the display panel 2141.

In an embodiment and is still another example, when a music streaming icon displayed on the display module 2140 is selected, the processor 2110 obtains a user input via the input sensor 2161-2 and may activate a music streaming application stored in the memory 2120. When a music execution command is input in the music streaming application, the processor 2110 may activate a sound output module 2163 to provide sound information corresponding to the music execution command to the user.

In the above, in an embodiment, an operation of the electronic device 2101 has been briefly described. Hereinafter, a configuration of the electronic device 2101 will be described in detail. Some components of the electronic device 2101 described below may be integrated and provided as one component, and/or one component may be provided separately as two or more components.

In an embodiment and referring to FIG. 20, the electronic device 2101 may communicate with an external electronic device 2102 via a network (e.g., a short-range wireless communication network and/or a long-range wireless communication network). In an embodiment, the electronic device 2101 may include the processor 2110, the memory 2120, the input module 2130, the display module 2140, a power management module 2150, an internal module 2160 and an external module 2170. In an embodiment, at least one of the components may be omitted from the electronic device 2101, and/or one or more other components may be added in the electronic device 2101. In an embodiment, some of the components (e.g., the sensor module 2161, an antenna module 2162, and/or the sound output module 2163) may be implemented as a single component (e.g., the display module 2140).

In an embodiment, the processor 2110 may execute software to control at least one other component (e.g., a hardware or software component) of the electronic device 2101 coupled with the processor 2110, and may perform various data processing or computation. According to an embodiment, as at least part of the data processing or computation, the processor 2110 may store a command and/or data received from another component (e.g., the input module 2130, the sensor module 2161 or a communication module 2173) in a volatile memory 2121, may process the command or the data stored in the volatile memory 2121, and/or may store resulting data in a non-volatile memory 2122.

In an embodiment, the processor 2110 may include a main processor 2111 and an auxiliary processor 2112. The main processor 2111 may include one or more of a central processing unit (CPU) 2111-1 and/or an application processor (AP). The main processor 2111 may further include any one or more of a graphics processing unit (GPU) 2111-2, a communication processor (CP), and an image signal processor (ISP). The main processor 2111 may further include a neural processing unit (NPU) 2111-3. The NPU 2111-3 may be a processor specialized in processing an artificial intelligence model, and/or the artificial intelligence model may be generated through machine learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network and/or a combination of two or more thereof, but is not limited thereto. The artificial intelligence model may, additionally or alternatively, include a software structure other than a hardware structure. At least two of the above-described processing units and processors may be implemented as an integrated component (e.g., a single chip), or respective processing units and processors may be implemented as independent components (e.g., a plurality of chips).

In an embodiment, the auxiliary processor 2112 may include a controller. The controller may include an interface conversion circuit and a timing control circuit. The controller may receive an image signal from the main processor 2111, may convert a data format of the image signal to meet interface specifications with the display module 2140, and may output image data. The controller may output various control signals required for driving the display module 2140.

In an embodiment, the auxiliary processor 2112 may further include a data conversion circuit 2112-2, a gamma correction circuit 2112-3, a rendering circuit 2112-4, and/or the like. The data conversion circuit 2112-2 may receive image data from the controller. The data conversion circuit 2112-2 may compensate for the image data such that an image is displayed with a desired luminance according to characteristics of the electronic device 2101 and/or the user's setting, and/or may convert the image data to reduce power consumption and/or to eliminate an afterimage. The gamma correction circuit 2112-3 may convert image data and/or a gamma reference voltage so that an image displayed on the electronic device 2101 has desired gamma characteristics. The rendering circuit 2112-4 may receive image data from the controller, and may render the image data in consideration of a pixel arrangement of the display panel 2141 in the electronic device 2101. At least one of the data conversion circuit 2112-2, the gamma correction circuit 2112-3 and the rendering circuit 2112-4 may be integrated in another component (e.g., the main processor 2111 or the controller). At least one of the data conversion circuit 2112-2, the gamma correction circuit 2112-3 and the rendering circuit 2112-4 may be integrated in a data driver 2143 described below.

In an embodiment, the memory 2120 may store various data used by at least one component (e.g., the processor 2110 or the sensor module 2161) of the electronic device 2101. The various data may include, for example, input data and/or output data for a command related thereto. The memory 2120 may include at least one of the volatile memory 2121 and the non-volatile memory 2122.

In an embodiment, the input module 2130 may receive a command and/or data to be used by the components (e.g., the processor 2110, the sensor module 2161, and/or the sound output module 2163) of the electronic device 2101 from the outside of the electronic device 2101 (e.g., the user or the external electronic device 2102).

In an embodiment, the input module 2130 may include a first input module 2131 for receiving a command and/or data from the user, and a second input module 2132 for receiving a command and/or data from the external electronic device 2102. The first input module 2131 may include a microphone, a mouse, a keyboard, a key (e.g., a button) and/or a pen (e.g., a passive pen or an active pen). The second input module 2132 may support a designated protocol capable of connecting the electronic device 2101 to the external electronic device 2102 by wire and/or wirelessly. In some embodiments, the second input module 2132 may include a high definition multimedia interface (HDMI), a universal serial bus (USB) interface, an SD card interface and/or an audio interface. The second input module 2132 may include a connector that may physically connect the electronic device 2101 to the external electronic device 2102. For example, the second input module 2132 may include an HDMI connector, a USB connector, an SD card connector and/or an audio connector (e.g., a headphone connector).

In an embodiment, the display module 2140 may visually provide information to the user. The display module 2140 may include the display panel 2141, a scan driver 2142 and the data driver 2143. The display module 2140 may further include a window, a chassis and/or a bracket for protecting the display panel 2141.

In an embodiment, the display panel 2141 may include a liquid crystal display panel, an organic light emitting display panel and/or an inorganic light emitting display panel, but the type of the display panel 2141 is not limited thereto. The display panel 2141 may be a rigid type display panel, and/or a flexible type display panel capable of being rolled and/or folded. The display module 2140 may further include a supporter, a bracket and/or a heat dissipation member that supports the display panel 2141.

In an embodiment, the scan driver 2142 may be mounted on the display panel 2141 as a driving chip. Alternatively, the scan driver 2142 may be integrated into the display panel 2141. For example, the scan driver 2142 may include an amorphous silicon TFT gate driver circuit (ASG), a low temperature polycrystalline silicon (LTPS) TFT gate driver circuit and/or an oxide semiconductor TFT gate driver circuit (OSG) embedded in the display panel 2141. The scan driver 2142 may receive a control signal from the controller and may output scan signals to the display panel 2141 in response to the control signal.

In an embodiment, the display panel 2141 may further include an emission driver. The emission driver may output an emission control signal to the display panel 2141 in response to a control signal received from the controller. The emission driver may be formed separately from the scan driver 2142, or may be integrated into the scan driver 2142.

In an embodiment, the data driver 2143 may receive a control signal from the controller, may convert image data into analog voltages (e.g., data voltages) in response to the control signal, and then may output the data voltages to the display panel 2141.

In an embodiment, the data driver 2143 may be incorporated into other components (e.g., the controller). Further, the functions of the interface conversion circuit and/or the timing control circuit of the controller described above may be integrated into the data driver 2143.

In an embodiment, the display module 2140 may further include the emission driver, a voltage generator circuit, or the like. The voltage generator circuit may output various voltages used to drive the display panel 2141.

In an embodiment, the power management module 2150 may supply power to the components of the electronic device 2101. The power management module 2150 may include a battery that charges a power supply voltage. The battery may include a primary cell which is not rechargeable, a secondary cell which is rechargeable, and/or a fuel cell. The power management module 2150 may include a power management integrated circuit (PMIC). The PMIC may supply optimal power to each of the modules described above and modules described below. The power management module 2150 may include a wireless power transmission/reception member electrically connected to the battery. The wireless power transmission/reception member may include a plurality of antenna radiators in the form of coils.

In an embodiment, the electronic device 2101 may further include the internal module 2160 and the external module 2170. The internal module 2160 may include the sensor module 2161, the antenna module 2162 and the sound output module 2163. The external module 2170 may include the camera module 2171, a light module 2172 and the communication module 2173.

In an embodiment, the sensor module 2161 may detect an input by the user's body and/or an input by the pen of the first input module 2131, and may generate an electrical signal and/or data value corresponding to the input. The sensor module 2161 may include at least one of the fingerprint sensor 2161-1, the input sensor 2161-2 and a digitizer 2161-3.

In an embodiment, the fingerprint sensor 2161-1 may generate a data value corresponding to the user's fingerprint. The fingerprint sensor 2161-1 may include any one of an optical type fingerprint sensor and a capacitive type fingerprint sensor.

In an embodiment, the input sensor 2161-2 may generate a data value corresponding to coordinate information of the user's body input and/or the pen input. The input sensor 2161-2 may convert a capacitance change caused by the input into the data value. The input sensor 2161-2 may detect the input by the passive pen, and/or may transmit/receive data to/from the active pen.

In an embodiment, the input sensor 2161-2 may measure a bio-signal, such as blood pressure, moisture and/or body fat. For example, when a portion of the body of the user touches a sensor layer and/or a sensing panel, and does not move for a certain period of time, the input sensor 2161-2 may output information desired by the user to the display module 2140 by detecting the bio-signal based on a change in electric field due to the portion of the body.

In an embodiment, the digitizer 2161-3 may generate a data value corresponding to coordinate information of the input by the pen. The digitizer 2161-3 may convert an amount of an electromagnetic change caused by the input into the data value. The digitizer 2161-3 may detect the input by the passive pen, and/or may transmit/receive data to/from the active pen.

In an embodiment, at least one of the fingerprint sensor 2161-1, the input sensor 2161-2 and the digitizer 2161-3 may be implemented as a sensor layer formed on the display panel 2141 through a continuous process. The fingerprint sensor 2161-1, the input sensor 2161-2 and the digitizer 2161-3 may be disposed above the display panel 2141, and/or at least one of the fingerprint sensor 2161-1, the input sensor 2161-2 and the digitizer 2161-3 may be disposed below the display panel 2141.

In an embodiment, two or more of the fingerprint sensor 2161-1, the input sensor 2161-2 and the digitizer 2161-3 may be integrated into one sensing panel through the same process. When integrated into one sensing panel, the sensing panel may be disposed between the display panel 2141 and a window disposed above the display panel 2141. In an embodiment, the sensing panel may be disposed on the window, but the location of the sensing panel is not limited thereto.

In an embodiment, at least one of the fingerprint sensor 2161-1, the input sensor 2161-2 and the digitizer 2161-3 may be embedded in the display panel 2141. In other words, at least one of the fingerprint sensor 2161-1, the input sensor 2161-2 and the digitizer 2161-2 may be simultaneously formed through a process of forming elements (e.g., light emitting elements, transistors, etc.) included in the display panel 2141.

In addition, in an embodiment, the sensor module 2161 may generate an electrical signal and/or a data value corresponding to an internal state and/or an external state of the electronic device 2101. The sensor module 2161 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor and/or an illuminance sensor.

In an embodiment, the antenna module 2162 may include one or more antennas for transmitting and/or receiving a signal and/or power to and/or from the outside. In an embodiments, the communication module 2173 may transmit and/or receive a signal to and/or from the external electronic device 2102 through an antenna suitable for a communication method. An antenna pattern of the antenna module 2162 may be integrated into one component (e.g., the display panel 2141) of the display module 2140 or the input sensor 2161-2.

In an embodiment, the sound output module 2163 may output sound signals to the outside of the electronic device 2101. The sound output module 2163 may include, for example, a speaker and/or a receiver. The speaker may be used for general purposes, such as playing multimedia and/or playing record. The receiver may be used for receiving incoming calls. In an embodiment, the receiver may be implemented as separate from, and/or as part of the speaker. A sound output pattern of the sound output module 2163 may be integrated into the display module 2140.

In an embodiment, the camera module 2171 may capture a still image and/or a moving image. In an embodiment, the camera module 2171 may include one or more lenses, an image sensor and/or an image signal processor. The camera module 2171 may further include an infrared camera capable of measuring the presence and/or absence of the user, the user's location and/or the user's line of sight.

In an embodiment, the light module 2172 may provide light. The light module 2172 may include a light emitting diode and/or a xenon lamp. The light module 2172 may operate in conjunction with the camera module 2171, and/or may operate independently of the camera module 2171.

In an embodiment, the communication module 2173 may support establishing a wired and/or wireless communication channel between the electronic device 2101 and the external electronic device 2102 and performing communication via the established communication channel. The communication module 2173 may include a wireless communication module (e.g., a cellular communication module, a short-range wireless communication module or a global navigation satellite system (GNSS) communication module) and/or a wired communication module (e.g., a local area network (LAN) communication module or a power line communication (PLC) module). The communication module 2173 may communicate with the external electronic device 2102 via a short-range communication network (e.g., Bluetooth™, wireless-fidelity (Wi-Fi) direct, or infrared data association (IrDA)) and/or a long-range communication network (e.g., a cellular network, the Internet or a computer network (e.g., LAN or wide area network (WAN)). These various types of communication modules 2173 may be implemented as a single chip, and/or may be implemented as multi-chips separate from each other.

In an embodiment, the input module 2130, the sensor module 2161, the camera module 2171, and the like may be used to control an operation of the display module 2140 in conjunction with the processor 2110.

In an embodiment, the processor 2110 may output a command and/or data to the display module 2140, the sound output module 2163, the camera module 2171 and/or the light module 2172 based on input data received from the input module 2130. For example, the processor 2110 may generate image data corresponding to input data applied through a mouse and/or an active pen, and may output the image data to the display module 2140. Alternatively, the processor 2110 may generate command data corresponding to the input data, and may output the command data to the camera module 2171 and/or the light module 2172. When no input data is received from the input module 2130 for a certain period of time, the processor 2110 may switch an operation mode of the electronic device 2101 to a low power mode and/or a sleep mode, thereby reducing power consumption of the electronic device 2101.

In an embodiment, the processor 2110 may output a command and/or data to the display module 2140, the sound output module 2163, the camera module 2171 and/or the light module 2172 based on sensing data received from the sensor module 2161. For example, the processor 2110 may compare authentication data applied by the fingerprint sensor 2161-1 with authentication data stored in the memory 2120, and then may execute an application according to the comparison result. The processor 2110 may execute a command and/or output corresponding image data to the display module 2140 based on the sensing data sensed by the input sensor 2161-2 and/or the digitizer 2161-3. In a case where the sensor module 2161 includes a temperature sensor, the processor 2110 may receive temperature data from the sensor module 2161, and may further perform luminance correction on the image data based on the temperature data.

In an embodiment, the processor 2110 may receive measurement data about the presence and/or absence of the user, the location of the user and/or the user's line of sight from the camera module 2171. The processor 2110 may further perform luminance correction on the image data based on the measurement data. For example, after the processor 2110 determines the presence or absence of the user based on the input from the camera module 2171, the data conversion circuit 2112-2 and/or the gamma correction circuit 2112-3 may perform the luminance correction on the image data, and the processor 2110 may provide the luminance-corrected image data to the display module 2140.

In an embodiment, at least some of the above-described components may be coupled mutually and communicate signals (e.g., commands or data) therebetween via an inter-peripheral communication scheme (e.g., a bus, general purpose input and output (GPIO), serial peripheral interface (SPI), mobile industry processor interface (MIPI) and/or ultra-path interconnect (UPI)). The processor 2110 may communicate with the display module 2140 via an agreed interface. Further, any one of the above-described communication methods may be used between the processor 2110 and the display module 2140, but the communication method between the processor 2110 and the display module 2140 is not limited to the above-described communication method.

In an embodiment, the electronic device 2101 according to various embodiments described above may be various types of devices. For example, the electronic device 2101 may include at least one of a portable communication device (e.g., a smart phone), a computer device, a portable multimedia device, a portable medical device, a camera, a wearable device and/or a home appliance. However, the electronic device 2101 according to an embodiment is not limited to the above-described devices.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. An electronic device comprising:

a processor configured to provide input image data; and a display device configured to receive the input image data from the processor, and to display an image based on the input image data, the display device comprising:

a display panel including a plurality of pixels, each of the plurality of pixels including a first color sub-pixel, a second color sub-pixel and a third color sub-pixel; and a panel driver configured to drive the display panel based on input image data, the panel driver further configured to:

store a gamma curve characteristic to which a color crosstalk offset of the display panel is applied;

detect mixed color pixels among the plurality of pixels by analyzing the input image data;

determine a compensation coefficient for each of the mixed color pixels based on the input image data for each of the mixed color pixels; and compensate a luminance of each of the mixed color pixels based on the color crosstalk offset and the compensation coefficient, wherein color crosstalk values of the display panel are calculated at respective gray levels, and the color crosstalk offset corresponds to a difference between a reference color crosstalk value and an average of the color crosstalk values.

2. The electronic device of claim 1, wherein the color crosstalk value at each gray level is determined based on "CCT=(LW−LR−LG−LB)/LW*100", wherein CCT denotes the color crosstalk value, LW denotes a white luminance of the display panel when all of the first, second and third color sub-pixels emit light, LR denotes a first color luminance of the display panel when the first color sub-pixel emits light, LG denotes a second color luminance of the display panel when the second color sub-pixel emits light, and LB denotes a third color luminance of the display panel when the third color sub-pixel emits light.

3. The electronic device of claim 1, wherein the color crosstalk values of the display panel are calculated at gray levels greater than or equal to a reference gray level, and the color crosstalk offset is determined based on the average of the color crosstalk values at the gray levels greater than or equal to the reference gray level.

4. The electronic device of claim 1, wherein, when the color crosstalk offset has a negative value, the gamma curve characteristic decreases by an amount of the color crosstalk offset from a reference gamma curve characteristic, and wherein, when the color crosstalk offset has a positive value, the gamma curve characteristic increases by an amount of the color crosstalk offset from the reference gamma curve characteristic.

5. The electronic device of claim 1, wherein the input image data for each of the plurality of pixels includes first color sub-pixel data for the first color sub-pixel, second color sub-pixel data for the second color sub-pixel, and third color sub-pixel data for the third color sub-pixel, and wherein the panel driver determines a first pixel among the plurality of pixels as a mixed color pixel when at least two of the first color sub-pixel data, the second color sub-pixel data and the third color sub-pixel data for the first pixel represent a non-zero gray level.

6. The electronic device of claim 5, wherein the panel driver normalizes the first color sub-pixel data, second color sub-pixel data and third color sub-pixel data for the mixed color pixel such that a maximum sub-pixel data among the first color sub-pixel data, second color sub-pixel data and third color sub-pixel data for the mixed color pixel has a value of about 1, and determines an average of the normalized first color sub-pixel data, second color sub-pixel data and third color sub-pixel data as the compensation coefficient of the mixed color pixel.

7. The electronic device of claim 5, wherein the panel driver normalizes the first color sub-pixel data, second color sub-pixel data and third color sub-pixel data for the mixed color pixel such that a maximum sub-pixel data among the first color sub-pixel data, second color sub-pixel data and third color sub-pixel data for the mixed color pixel has a value of about 1, calculates a weighted average of the first color sub-pixel data, second color sub-pixel data and third color sub-pixel data by applying weights to the normalized first color sub-pixel data, second color sub-pixel data and third color sub-pixel data, and determines the weighted average of the first color sub-pixel data, second color sub-pixel data and third color sub-pixel data as the compensation coefficient of the mixed color pixel.

8. The electronic device of claim 1, wherein, when the color crosstalk offset has a negative value, the panel driver increases the luminance of each of the mixed color pixels by a product of an amount of the color crosstalk offset and the compensation coefficient, and wherein, when the color crosstalk offset has a positive value, the panel driver decreases the luminance of each of the mixed color pixels by a product of an amount of the color crosstalk offset and the compensation coefficient.

9. The electronic device of claim 1, wherein the panel driver includes:

a gamma characteristic storage configured to store the gamma curve characteristic to which the color crosstalk offset is applied;

a controller configured to receive the input image data, detect the mixed color pixels among the plurality of pixels, determine the compensation coefficient of each of the mixed color pixels, and generate output image data based on the input image data, the color crosstalk offset and the compensation coefficient; and a data driver configured to provide data signals to the plurality of pixels based on the output image data.

10. The electronic device of claim 9, wherein the controller searches for an original luminance corresponding to an input gray level represented by the input image data for each of the mixed color pixels in the gamma curve characteristic, determines a target luminance by adjusting the original luminance by a product of an amount of the color crosstalk offset and the compensation coefficient, and generates the output image data representing an output gray level for each of the mixed color pixels by searching for the output gray level corresponding to the target luminance in the gamma curve characteristic.

11. The electronic device of claim 9, wherein the gamma characteristic storage includes:

a plurality of input gray-output gray lookup tables respectively corresponding to a plurality of corrected gamma curve characteristics that are compensated based on a plurality of compensation coefficients.

12. The electronic device of claim 11, wherein the controller selects an input gray-output gray lookup table corresponding to the compensation coefficient of each of the mixed color pixels from among the plurality of input gray-output gray lookup tables, determines an output gray level corresponding to an input gray level represented by the input image data for each of the mixed color pixels using the selected input gray-output gray lookup table, and generates the output image data representing the output gray level for each of the mixed color pixels.

13. The electronic device of claim 9, wherein the gamma characteristic storage includes:

a plurality of input gray-output gray lookup tables respectively corresponding to a plurality of reference corrected gamma curve characteristics that are compensated based on a plurality of reference compensation coefficients.

14. The electronic device of claim 13, wherein the controller selects two input gray-output gray lookup tables corresponding to two reference compensation coefficients located adjacent to the compensation coefficient of each of the mixed color pixels from among the plurality of input gray-output gray lookup tables, determines two output gray levels corresponding to an input gray level represented by the input image data for each of the mixed color pixels in the selected two input gray-output gray lookup tables, and generates the output image data representing an interpolated output gray level for each of the mixed color pixels by interpolating the two output gray levels.

15. An electronic device comprising:

a processor configured to provide input image data; and a display device configured to receive the input image data from the processor, and to display an image based on the input image data, the display device comprising:

a display panel including a plurality of pixels, each of the plurality of pixels including a first color sub-pixel, a second color sub-pixel and a third color sub-pixel; and a panel driver configured to drive the display panel based on input image data, the panel driver further configured to:

store a gamma curve characteristic to which a color crosstalk offset of the display panel is applied;

detect mixed color pixels among the plurality of pixels by analyzing the input image data;

determine a compensation coefficient for each of the mixed color pixels based on the input image data for each of the mixed color pixels; and compensate a luminance of each of the mixed color pixels based on the color crosstalk offset and the compensation coefficient, wherein entire gray levels are divided into gray regions, an average of color crosstalk values of the display panel is calculated for each of the gray regions, and the color crosstalk offset is determined based on the average of the color crosstalk values of each of the gray regions.

16. A method of operating a display device including a plurality of pixels, each of the plurality of pixels including a first color sub-pixel, a second color sub-pixel and a third color sub-pixel, the method comprising:

storing a gamma curve characteristic to which a color crosstalk offset of a display panel of the display device is applied;

receiving input image data;

detecting mixed color pixels among the plurality of pixels by analyzing the input image data;

determining a compensation coefficient of each of the mixed color pixels based on the input image data for each of the mixed color pixels; and compensating a luminance of each of the mixed color pixels based on the color crosstalk offset and the compensation coefficient, wherein compensating the luminance of each of the mixed color pixels includes:

searching for an original luminance corresponding to an input gray level represented by the input image data for each of the mixed color pixels in the gamma curve characteristic;

determining a target luminance by adjusting the original luminance by a product of an amount of the color crosstalk offset and the compensation coefficient;

searching for an output gray level corresponding to the target luminance in the gamma curve characteristic; and driving the display panel based on output image data representing the output gray level for each of the mixed color pixels.

17. The method of claim 16, wherein storing the gamma curve characteristic to which the color crosstalk offset is applied includes:

storing a plurality of input gray-output gray lookup tables respectively corresponding to a plurality of corrected gamma curve characteristics that are compensated based on a plurality of compensation coefficients, and wherein compensating the luminance of each of the mixed color pixels includes:

selecting an input gray-output gray lookup table corresponding to the compensation coefficient of each of the mixed color pixels from among the plurality of input gray-output gray lookup tables;

determining an output gray level corresponding to an input gray level represented by the input image data for each of the mixed color pixels using the selected input gray-output gray lookup table; and driving the display panel based on output image data representing the output gray level for each of the mixed color pixels.

* * * * *